(12) United States Patent
Song et al.

(10) Patent No.: US 9,696,590 B2
(45) Date of Patent: Jul. 4, 2017

(54) LIQUID CRYSTAL DISPLAY

(71) Applicant: Samsung Display Co., Ltd., Yongin, Gyeonggi-do (KR)

(72) Inventors: Dong Han Song, Hwaseong-si (KR); Ki Chul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 125 days.

(21) Appl. No.: 14/735,486

(22) Filed: Jun. 10, 2015

(65) Prior Publication Data

US 2016/0195783 A1   Jul. 7, 2016

(30) Foreign Application Priority Data

Jan. 5, 2015  (KR) .................. 10-2015-0000691

(51) Int. Cl.
*G02F 1/1343*   (2006.01)
*G02F 1/1337*   (2006.01)

(52) U.S. Cl.
CPC .. *G02F 1/133753* (2013.01); *G02F 1/133707* (2013.01); *G02F 1/134309* (2013.01); *G02F 2001/133757* (2013.01); *G02F 2001/134318* (2013.01); *G02F 2001/134345* (2013.01)

(58) Field of Classification Search
None
See application file for complete search history.

(56) References Cited

U.S. PATENT DOCUMENTS

| 8,178,172 | B2 | 5/2012 | Kim et al. |
| 8,395,736 | B2 | 3/2013 | Shin et al. |
| 2003/0071952 | A1* | 4/2003 | Yoshida ............ G02F 1/134363 349/141 |
| 2008/0024706 | A1* | 1/2008 | Yang ................. G02F 1/133707 349/129 |
| 2009/0079892 | A1* | 3/2009 | Hsien ................ G02F 1/133707 349/47 |
| 2009/0310049 | A1* | 12/2009 | Hsu ................... G02F 1/133707 349/38 |
| 2010/0007839 | A1* | 1/2010 | Jun ................... G02F 1/133707 349/141 |
| 2010/0149448 | A1* | 6/2010 | Kim .................. G02F 1/133707 349/42 |

(Continued)

FOREIGN PATENT DOCUMENTS

| KR | 1020060048459 A | 5/2006 |
| KR | 1020120058351 A | 6/2012 |

*Primary Examiner* — Ryan Crockett

(74) *Attorney, Agent, or Firm* — Innovation Counsel LLP

(57) ABSTRACT

There is provided a liquid crystal display, including: a first substrate; a plurality of pixel electrodes comprising a pixel electrode disposed on the first substrate and including a plate-like electrode having a plate shape and a plurality of minute branches extending from a side of the plate-like electrode to the outside; a second substrate facing the first substrate; a plurality of common electrodes comprising a common electrode disposed below the second substrate and including a plurality of minute branches positioned to correspond to the plate-like electrode of the pixel electrode and the plate-like electrode positioned to corresponding to the plurality of minute branches of the pixel electrode; and a liquid crystal layer disposed between the first substrate and the second substrate.

13 Claims, 21 Drawing Sheets

(56) References Cited

U.S. PATENT DOCUMENTS

| | | | |
|---|---|---|---|
| 2011/0169722 A1* | 7/2011 | Ogawa | G02F 1/133555 345/87 |
| 2012/0133872 A1* | 5/2012 | Kim | G02F 1/133707 349/128 |
| 2013/0033668 A1* | 2/2013 | Yao | G02F 1/133707 349/143 |
| 2013/0063686 A1* | 3/2013 | Tashiro | G02F 1/133707 349/98 |
| 2013/0128208 A1* | 5/2013 | Yao | G02F 1/134309 349/142 |
| 2013/0215341 A1* | 8/2013 | Rho | G02F 1/134309 349/15 |
| 2013/0215369 A1* | 8/2013 | Kimura | G02B 6/0051 349/138 |

* cited by examiner

LIQUID CRYSTAL DISPLAY

CROSS-REFERENCE TO RELATED APPLICATION

This application claims priority to and the benefit of Korean Patent Application No. 10-2015-0000691 filed in the Korean Intellectual Property Office on Jan. 5, 2015, the entire contents of which are incorporated herein by reference.

BACKGROUND (a) Field

The present application relates to a liquid crystal display.

(b) Description of the Related Art

A liquid crystal display is one of the flat panel displays which have been most widely used currently and includes two sheets of display panels in which field generating electrodes, such as a pixel electrode and a common electrode, are formed and a liquid crystal layer interposed therebetween. In the liquid crystal display, the field generating electrode is applied with a voltage to generate an electric field in the liquid crystal layer and an orientation of liquid crystal molecules of the liquid crystal layer is determined and polarization of incident light is controlled based on the generated electric field to display an image.

Among the liquid crystal displays, a liquid crystal display in a vertically aligned mode in which major axes of the liquid crystal molecules are aligned to be vertical to the upper and lower display panels in the state in which an electric field is not applied to the liquid crystal layer has a large contrast ratio and a wide reference viewing angle, and therefore has received attention.

In order to implement the wide viewing angle in the liquid crystal display in the vertically aligned mode, a plurality of domains having different alignment directions of the liquid crystal may be formed in one pixel.

As methods of forming the plurality of domains as described above, a method of forming a cut part, such as a fine slit, in the field generating electrode, a method for forming a protrusion on the field generating electrode, and the like are used. These methods may form the plurality of domains by aligning the liquid crystal molecules in a direction vertical to a fringe field by a fringe field formed between an edge of the cut part or the protrusion and the field generating electrode facing the edge.

Meanwhile, the liquid crystal display in the vertically aligned mode may have side visibility more reduced than front visibility. To solve the problem, a method for dividing the one pixel into two sub-pixels and making voltages of the two sub-pixels different has been proposed.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a liquid crystal display having features of improving side visibility and an aperture ratio.

An exemplary embodiment provides a liquid crystal display, including: a first substrate; a plurality of pixel electrodes comprising a pixel electrode disposed on the first substrate and including a plate-like electrode having a plate shape and a plurality of minute branches extending from a side of the plate-like electrode to the outside; a second substrate facing the first substrate; a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and a liquid crystal layer disposed between the first substrate and the second substrate.

The pixel electrode and the common electrode may each include four domains.

The domains may be arranged in 2 rows×2 columns and a first domain may be disposed in a second column of a first row, a second domain may be disposed in a first column of the first row, a third domain may be disposed in a first column of a second row, and a fourth domain may be disposed in a second column of the second row.

The first domain and the third domain of the pixel electrode may be provided with the plate-like electrode and the second domain and the fourth domain of the pixel electrode may be provided with the plurality of minute branches and the first domain and the third domain of the common electrode are provided with the plurality of minute branches and the second domain and the fourth domain of the common electrode are provided with the plate-like electrode.

The first domain and the fourth domain of the pixel electrode may be provided with the plate-like electrode and the second domain and the third domain of the pixel electrode may be provided with the plurality of minute branches and the first domain and the fourth domain of the common electrode may be provided with the plurality of minute branches and the second domain and the third domain of the common electrode may be provided with the plate-like electrode.

The first domain and the fourth domain of the pixel electrode may be provided with the plate-like electrode and the second domain and the third domain of the pixel electrode may be provided with the plurality of minute branches and the first domain and the fourth domain of the common electrode may be provided with the plurality of minute branches and the second domain and the third domain of the common electrode may be provided with the plate-like electrode.

The second domain and the third domain of the pixel electrode may be provided with the plate-like electrode and the first domain and the fourth domain of the pixel electrode may be provided with the plurality of minute branches and the second domain and the third domain of the common electrode may be provided with the plurality of minute branches and the first domain and the fourth domain of the common electrode may be provided with the plate-like electrode.

A plurality of pixels including the pixel electrodes and the common electrodes may include vertical central regions positioned between the first and fourth domains and the second and third domains and horizontal central regions positioned between the first and second domains and the third and fourth domains.

Liquid crystal molecules positioned in the vertical central regions may head for a horizontal direction at the time of applying a voltage and liquid crystal molecules positioned at the horizontal central regions may head for a vertical direction at the time of applying a voltage.

The liquid crystal molecules positioned in the vertical central regions may lie at 45° or less based on a horizontal side.

The plurality of minute branches may be formed at an angle from 40° to 50° with respect to a horizontal direction or a vertical direction.

The pixel electrode and the common electrode may have a rectangular shape of which the vertical length is longer than a horizontal length.

The pixel electrode may include a first sub-pixel electrode and a second sub-pixel electrode and the common electrode may include a first sub-common electrode and a second sub-common electrode.

The first sub-pixel electrode, the second sub-pixel electrode, the first sub-common electrode, and the second sub-common electrode may each include four domains.

The domains may be arranged in 2 rows×2 columns and a first domain may be disposed in a second column of a first row, a second domain may be disposed in a first column of the first row, a third domain may be disposed in a first column of a second row, and the fourth domain may be disposed in a second column of the second row.

The first domain and the third domain of the sub-pixel electrodes may be provided with the plate-like electrode and the second domain and the fourth domain of the sub-pixel electrodes may be provided with the plurality of minute branches and the first domain and the third domain of the sub-common electrodes may be provided with the plurality of minute branches and the second domain and the fourth domain of the sub-common electrodes may be provided with the plate-like electrode.

The first domain and the fourth domain of the sub-pixel electrodes may be provided with the plate-like electrode and the second domain and the third domain of the sub-pixel electrodes may be provided with the plurality of minute branches and the first domain and the fourth domain of the sub-common electrodes may be provided with the plurality of minute branches and the second domain and the third domain of the sub-common electrodes may be provided with the plate-like electrode.

The first domain and the fourth domain of the sub-pixel electrodes may be provided with the plate-like electrode and the second domain and the third domain of the sub-pixel electrodes may be provided with the plurality of minute branches and the first domain and the fourth domain of the sub-common electrodes may be provided with the plurality of minute branches and the second domain and the third domain of the sub-common electrodes may be provided with the plate-like electrode.

The second domain and the third domain of the sub-pixel electrodes may be provided with the plate-like electrode and the first domain and the fourth domain of the sub-pixel electrodes may be provided with the plurality of minute branches and the second domain and the third domain of the sub-common electrodes may be provided with the plurality of minute branches and the first domain and the fourth domain of the sub-common electrodes may be provided with the plate-like electrode.

Other features of the inventive concept will be described below or will be clearly understood to those skilled in the art from the technology and description.

According to an exemplary embodiment, the following effects may be obtained.

The liquid crystal display includes the plate-like electrodes having a plate shape which are disposed in the pixel electrode and the common electrode, respectively, while being symmetrical to each other and the plurality of minute branches to control the liquid crystal molecules positioned in the vertical central region of the pixel to be in the horizontal direction, thereby improving the side visibility and the aperture ratio.

Further, other features may be newly understood based on the exemplary embodiments.

DETAILED DESCRIPTION OF THE EMBODIMENTS

Figure 1:
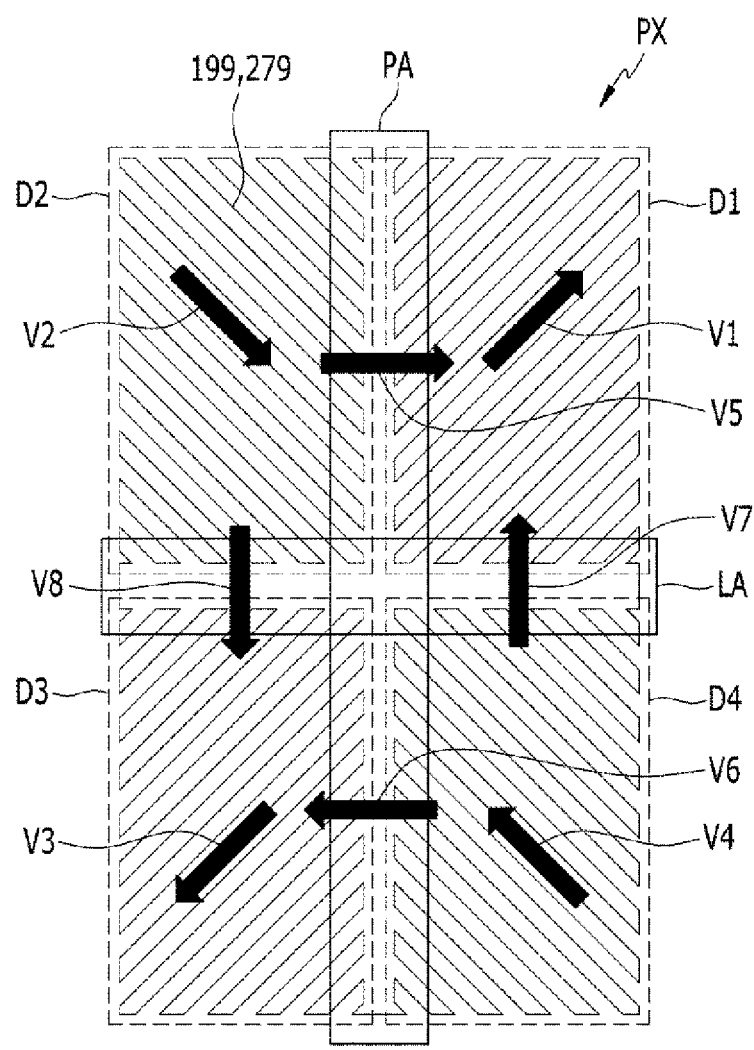
FIG. 1 is a plan view illustrating one pixel including a pixel electrode and a common electrode of a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to the exemplary embodiment will be described with reference to FIGS. 1 to 4.

Figure 2:
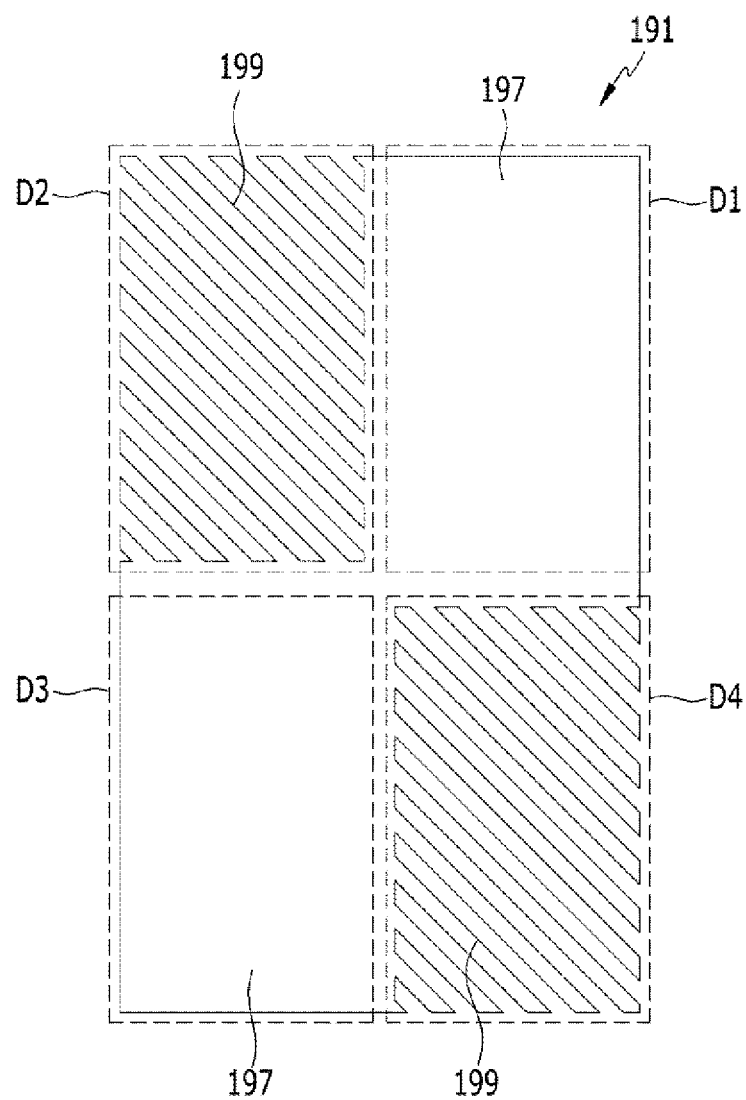
FIG. 2 is a plan view illustrating the pixel electrode of the one pixel illustrated in FIG. 1.
Figure 3:
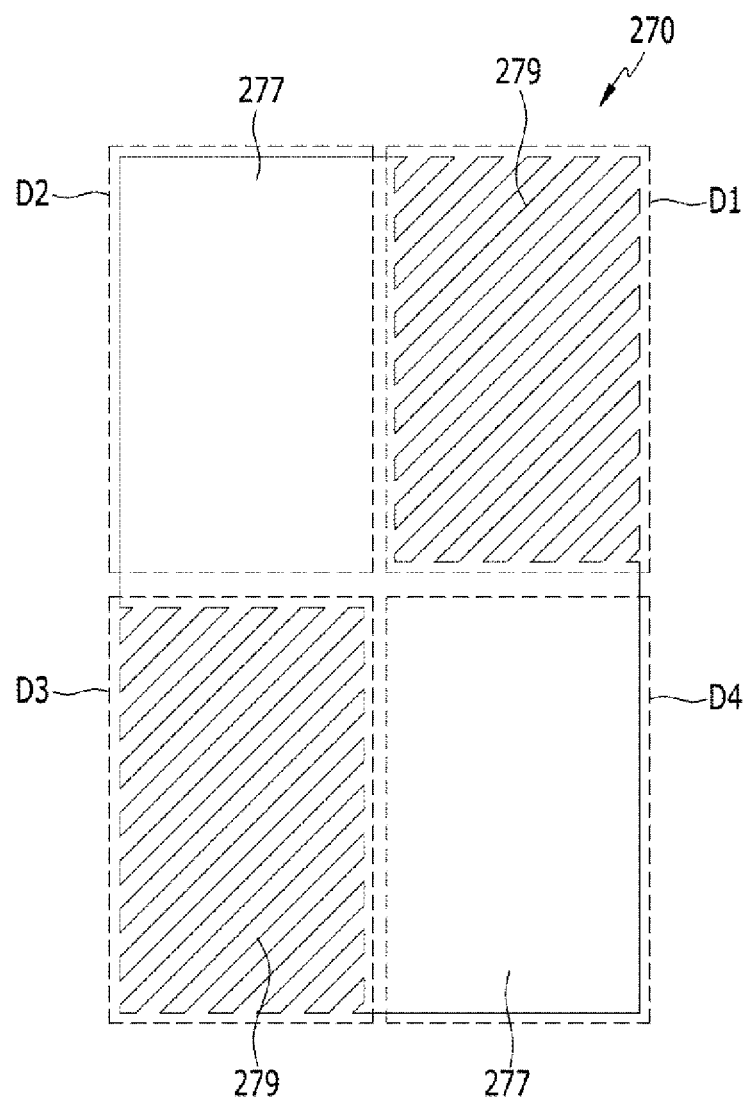
FIG. 3 is a plan view illustrating the common electrode of the one pixel illustrated in FIG. 1.
Figure 4:
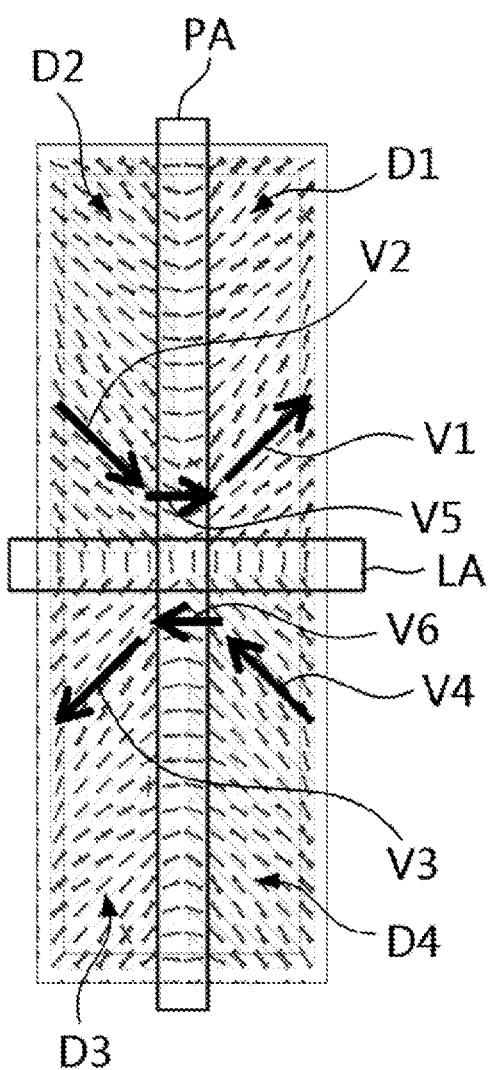
FIG. 4 is a diagram for describing an orientation of liquid crystal molecules for the one pixel illustrated in FIG. 1.

FIG. 1 is a plan view illustrating one pixel PX including a pixel electrode and a common electrode of a liquid crystal display according to an exemplary embodiment. FIG. 2 is a plan view illustrating a pixel electrode 191 of the one pixel PX illustrated in FIG. 1. FIG. 3 is a plan view illustrating a common electrode 270 of the one pixel PX illustrated in FIG. 1. FIG. 4 is a diagram for describing an orientation of liquid crystal molecules for the one pixel PX illustrated in FIG. 1.

Referring to FIG. 1 to FIG. 4, a liquid crystal display according to an exemplary embodiment includes a liquid crystal panel assembly (not illustrated) and a gate driver (not illustrated) and a data driver (not illustrated) for driving the same.

The liquid crystal panel assembly includes a plurality of signal lines and a plurality of pixels PXs which are connected to the plurality of signal lines and are arranged in substantially a matrix form. The liquid crystal panel assembly includes a lower panel (not illustrated) and an upper panel (not illustrated) which face each other and a liquid crystal layer (not illustrated) interposed between the two display panels. Alignment layers (not illustrated) may be positioned in inner surfaces of the two display panels and may be a vertical alignment layer. Further, an outer surface of at least one of the two display panels is provided with a polarizer (not illustrated) and a polarization axis of the two polarizers may be orthogonal to each other.

A signal line includes a plurality of gate lines (not illustrated) transferring gate signals (referred to as "scanning line") and a plurality of data lines (not illustrated) transferring a data voltage. Gate lines may extend approximately in a row direction and be substantially parallel with each other and data lines may extend approximately in a column direction and be substantially parallel with each other.

Each pixel PX includes a liquid crystal capacitor (not illustrated) and a switching element (not illustrated) connected thereto. The switching element may be a three terminal element such as a thin film transistor. A control terminal of the switching element may be connected to the gate line, an input terminal thereof may be connected to the data line, and an output terminal thereof may be directly and indirectly connected to the liquid crystal capacitor.

The liquid crystal capacitor may use two electrodes, for example, the pixel electrode 191 of a lower display panel and the common electrode 270 of an upper display panel as two terminals and serves as a liquid crystal layer between the two electrodes as a dielectric material.

Each pixel PX may further include a sustain capacitor (not illustrated) which may play a supporting role of the liquid crystal capacitor.

Referring to FIGS. 1 to 3, the pixel electrode 191 and the common electrode 270 according to an exemplary embodiment each include four domains D1, D2, D3, and D4.

The first domain D1 is disposed in a second column of a first row, the second domain D2 is disposed in a first column of a first row, a third domain D3 is disposed in a first column of a second row, and the fourth domain D4 is disposed in a second column of a second row.

The pixel electrode 191 includes a plate-like electrode 197 having a plate shape while being positioned in two domains of the four domains D1, D2, D3, and D4 and a plurality of minute branches 199 which extend outwardly from a side of the plate-like electrode 197 while being positioned in the remaining two domains.

The common electrode 270 which faces the pixel electrode 191 includes a plate-like electrode 277 having a plate shape while being positioned in two domains of the four domains D1, D2, D3, and D4 and a plurality of minute branches 279 which extend outwardly from a side of the plate-like electrode 277 while being positioned in the remaining two domains.

The pixel electrode 191 and the common electrode 270 may have a rectangular shape of which the vertical length is longer than that of a horizontal length.

That is, in the pixel electrode 191 and the common electrode 270, four domains D1, D2, D3, and D4 in which a vertical side is longer than that of a horizontal side are disposed in a form of 2 rows×2 columns.

The plurality of minute branches 199 of the pixel electrode 191 and the plurality of minute branches 279 of the common electrode 270 may be formed to be from 40° to 50° with respect to a horizontal direction or a vertical direction, preferably, an angle of 45°.

In this case the plate-like electrode 197 of the pixel electrode 191 and the plurality of minute branches 279 of the common electrode 270 are positioned in the corresponding domains, the plurality of minute branches 199 of the pixel electrode 191 and the plate-like electrode 277 of the common electrode 270 may be positioned in the corresponding domains.

In more detail, the plate-like electrode 197 is positioned in the first domain D1 of the pixel electrode 191 and the plurality of minute branches 279 are positioned in the first domain D1 of the common electrode 270. The plurality of minute branches 199 are positioned in the second domain D2 of the pixel electrode 191 and the plate-like electrode 277 is positioned in the second domain D2 of the common electrode 270. The plate-like electrode 197 is positioned in the third domain D3 of the pixel electrode 191 and the plurality of minute branches 279 are positioned in the third domain D3 of the common electrode 270. Further, the plurality of minute branches 199 are positioned in the fourth domain D4 of the pixel electrode 191 and the plate-like electrode 277 is positioned in the fourth domain D4 of the common electrode 270.

As such, the plurality of pixels PX including the pixel electrodes 191 and the common electrodes 270 may include vertical central regions PAs which are positioned between the first and fourth domains D1 and D4 and the second and third domains D2 and D3 and horizontal central regions LAs which are positioned between the first and second domains D1 and D2 and the third and fourth domains D3 and D4.

That is, the plurality of pixels PXs including the pixel electrodes 191 and the common electrodes 270 include the first domains D1, the second domains D2, the third domains D3, the fourth domains D4, the vertical central regions PAs, and the horizontal central regions LAs.

Referring to FIG. 1, in each region D1, D2, D3, D4 of one pixel PX of the liquid crystal display according to the exemplary embodiment, an orientation of liquid crystal molecules at the time of applying a voltage to the pixel electrode 191 may be appreciated. Each vector V1, V2, V3, V4, V5, V6, V7, and V8 represents the orientation of the liquid crystal molecules when a voltage is applied to the pixel electrode 191 and the common electrode 270.

The liquid crystal molecules which are positioned in the first domain D1 have the first vector V1 which faces outwardly from a center at an angle of 45° with respect to a horizontal side and the liquid crystal molecules which are positioned in the second domain D2 have the second vector V2 which faces from the outside toward a center at an angle of −45° with respect to the horizontal side. In this case, the liquid crystal molecules of the vertical central region PA positioned between the first domain D1 and the second domain D2 have the fifth vector V5 which is a sum of the first vector V1 and the second vector V2. That is, the orientation of the liquid crystal molecules which are positioned in the vertical central region PA positioned between the first domain D1 and the second domain D2 faces horizontally from left to right.

The liquid crystal molecules which are positioned in the third domain D3 have the third vector V3 which faces outwardly from a center at an angle of 225° with respect to the horizontal side and the liquid crystal molecules which are positioned in the fourth domain D4 have the fourth vector V4 which faces from the outside toward a center at an angle of 135° with respect to the horizontal side. In this case, the liquid crystal molecules which are positioned in the vertical central region PA positioned between the third domain D3 and the fourth domain D4 have the sixth vector V6 which is a sum of the third vector V3 and the fourth vector V4. That is, the orientation of the liquid crystal molecules which are positioned in the vertical central region PA positioned between the third domain D3 and the fourth domain D4 faces horizontally from right to left.

The liquid crystal molecules which are positioned in the first domain D1 have the first vector V1 which faces outwardly from a center at an angle of 45° with respect to the horizontal side and the liquid crystal molecules which are positioned in the fourth domain D4 have the fourth vector V4 which faces from the outside toward a center at an angle of 135° with respect to the horizontal side. In this case, the liquid crystal molecules of the horizontal central region LA positioned between the first domain D1 and the fourth domain D4 have the seventh vector V7 which is a sum of the first vector V1 and the fourth vector V4. That is, the orientation of the liquid crystal molecules which are positioned in the horizontal central region LA positioned between the first domain D1 and the fourth domain D4 faces vertically from bottom to top.

The liquid crystal molecules which are positioned in the second domain D2 have the second vector V2 which faces from the outside toward the center at an angle of −45° with respect to a horizontal side and the liquid crystal molecules which are positioned in the third domain D3 have the third vector V3 which faces from the center toward the outside at an angle of 225° with respect to the horizontal side. In this case, the liquid crystal molecules of the horizontal central region LA positioned between the second domain D2 and the third domain D3 have the eighth vector V8 which is a sum of the second vector V2 and the third vector V3. That is, the orientation of the liquid crystal molecules which are positioned in the horizontal central region LA positioned between the second domain D2 and the third domain D3 faces vertically from top to bottom.

Referring to FIG. 4, the orientation of the liquid crystal molecules of one pixel of the liquid crystal display according to the exemplary embodiment may be appreciated.

It may be appreciated that the liquid crystal molecules of the vertical central region PA of the pixel lie horizontally and the liquid crystal molecules of the horizontal central region LA face vertically.

As such, one pixel of the liquid crystal display according to the exemplary embodiment has a rectangle of which the vertical side is longer than that of a horizontal side and the liquid crystal molecules of the vertical central region PA faces horizontally and the liquid crystal molecules of the horizontal central region LA faces vertically, thereby improving the side visibility.

Figure 5:
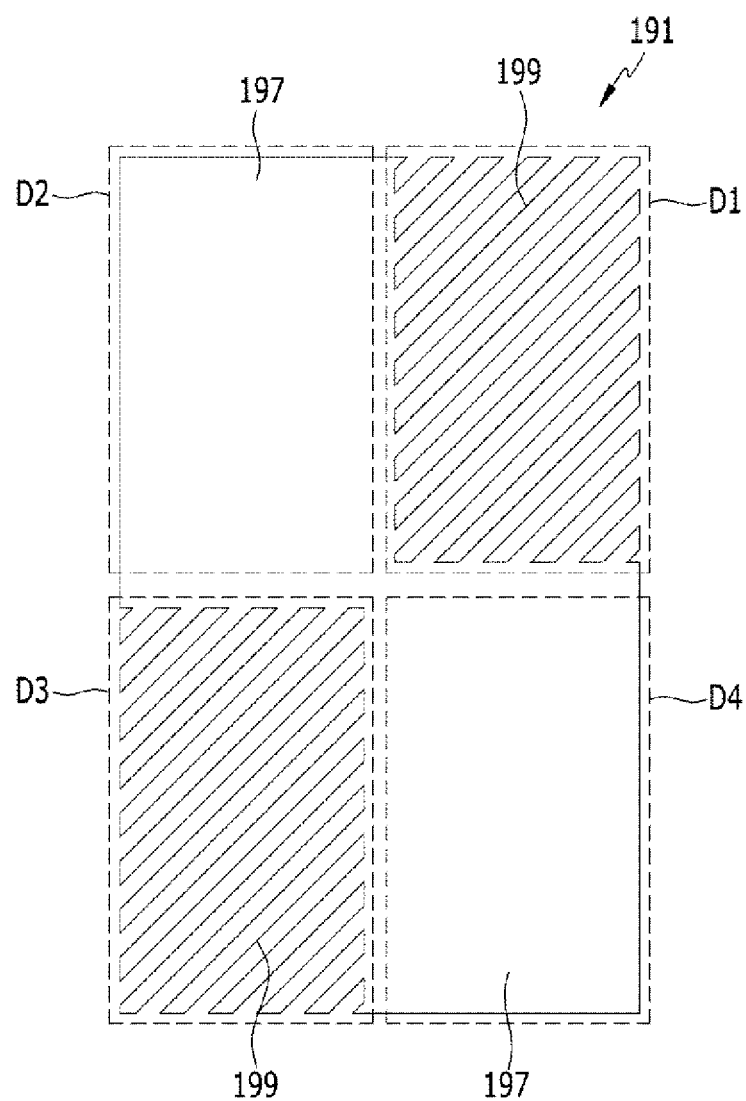
FIG. 5 is a plan view illustrating the pixel electrode of the liquid crystal display according to the exemplary embodiment.
Figure 6:
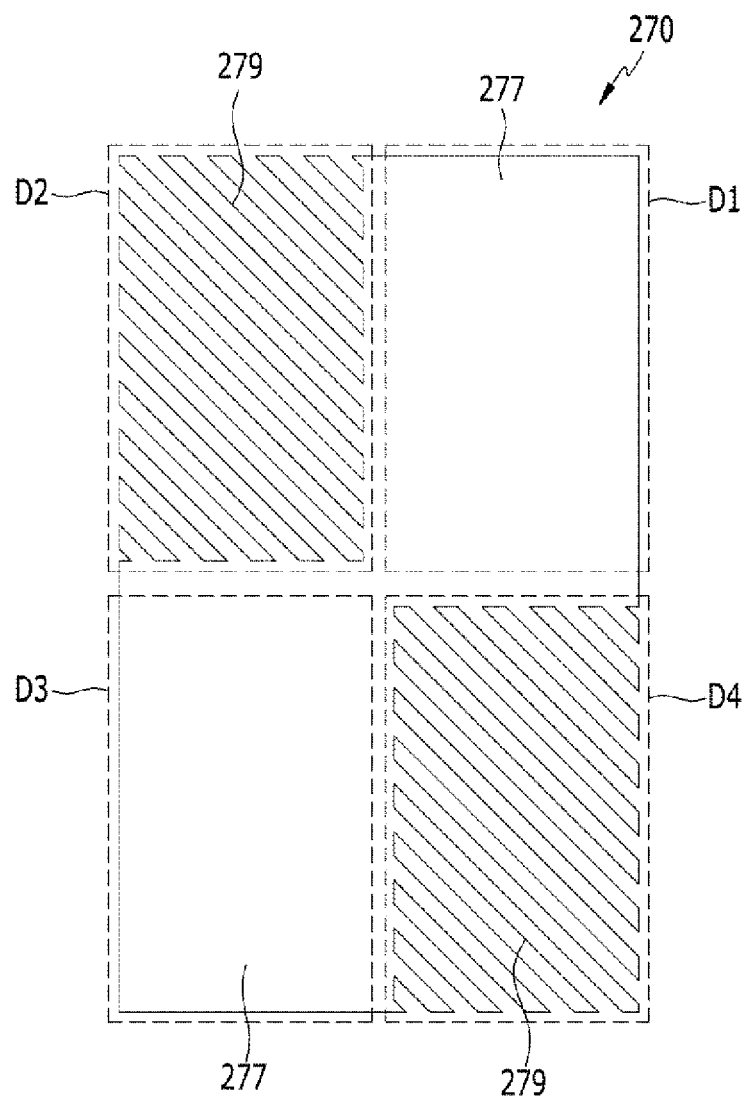
FIG. 6 is a plan view illustrating the common electrode of the liquid crystal display according to the exemplary embodiment.
Figure 7:
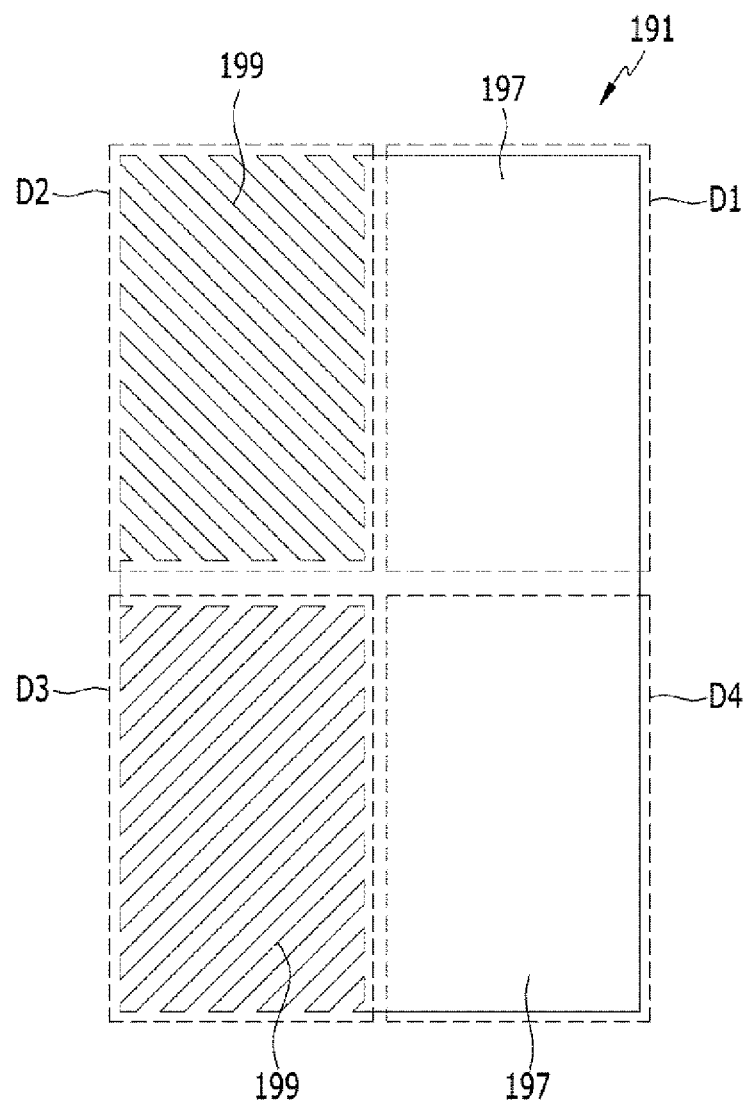
FIG. 7 is a plan view illustrating the pixel electrode of the liquid crystal display according to the exemplary embodiment.
Figure 8:
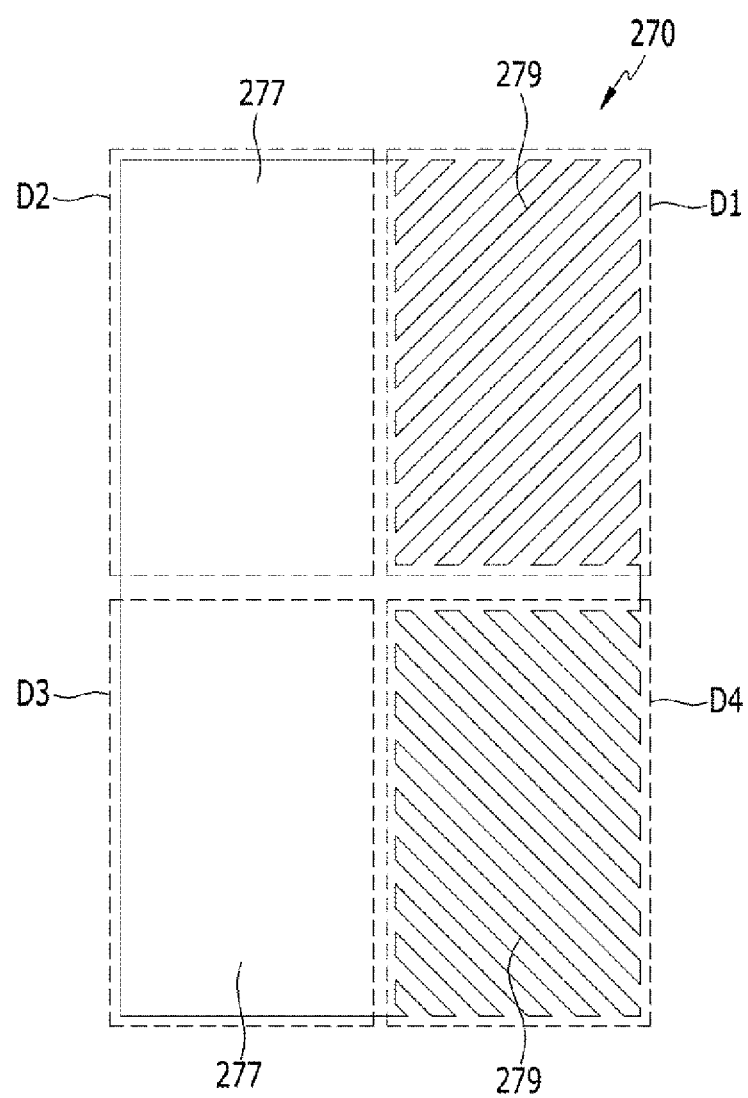
FIG. 8 is a plan view illustrating the common electrode of the liquid crystal display according to the exemplary embodiment.
Figure 9:
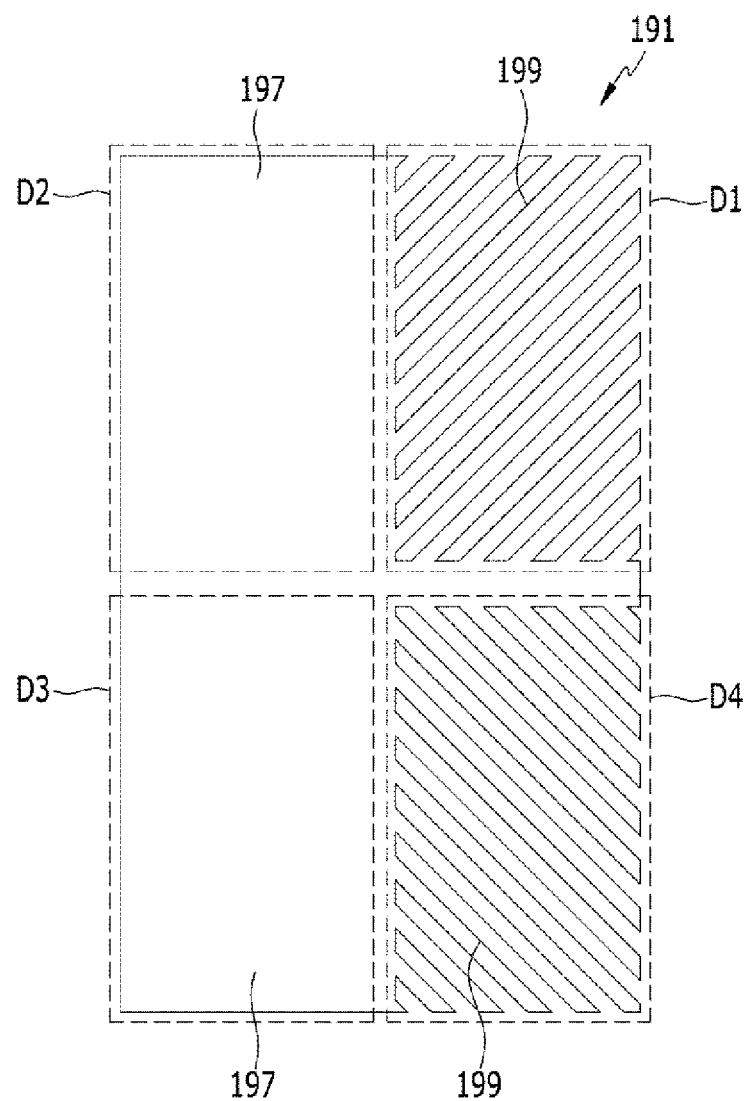
FIG. 9 is a plan view illustrating the pixel electrode of the liquid crystal display according to the exemplary embodiment.
Figure 10:
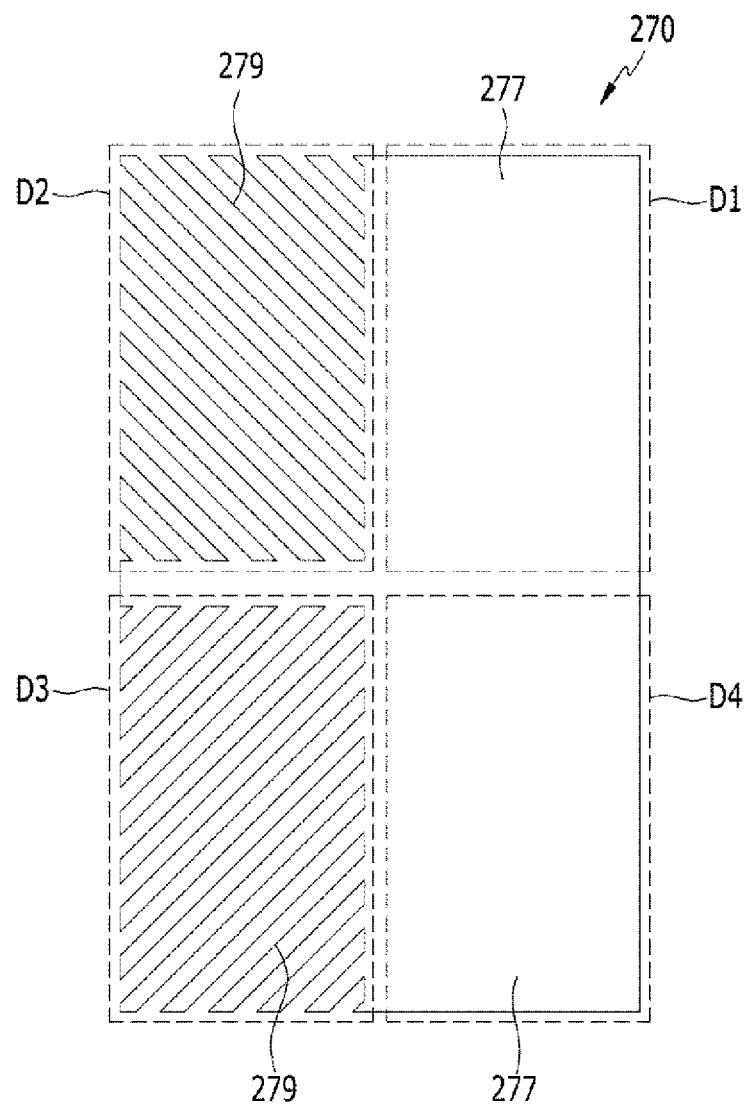
FIG. 10 is a plan view illustrating the common electrode of the liquid crystal display according to the exemplary embodiment.

FIG. 5 is a plan view illustrating the pixel electrode 191 of the liquid crystal display according to the exemplary embodiment and FIG. 6 is a plan view illustrating the common electrode 270 of the liquid crystal display according to the exemplary embodiment. FIG. 7 is a plan view illustrating the pixel electrode 191 of the liquid crystal display according to the exemplary embodiment and FIG. 8 is a plan view illustrating the common electrode 270 of the liquid crystal display according to the exemplary embodiment. FIG. 9 is a plan view illustrating the pixel electrode 191 of the liquid crystal display according to the exemplary embodiment and FIG. 10 is a plan view illustrating the common electrode 270 of the liquid crystal display according to the exemplary embodiment.

Referring first to FIG. 5 and FIG. 6, the plurality of minute branches 199 are positioned in the first domain D1 of the pixel electrode 191 and the plate-like electrode 277 is positioned in the first domain D1 of the common electrode 270. The plate-like electrode 197 is positioned in the second domain D2 of the pixel electrode 191 and the plurality of minute branches 279 are positioned in the second domain D2 of the common electrode 270. The plurality of minute branches 199 are positioned in the third domain D3 of the pixel electrode 191 and the plate-like electrode 277 is positioned in the third domain D3 of the common electrode 270. Further, the plate-like electrode 197 is positioned in the fourth domain D4 of the pixel electrode 191 and the plurality of minute branches 279 are positioned in the fourth domain D4 of the common electrode 270.

Although not illustrated, the pixel electrode 191 illustrated in FIG. 5 and the common electrode 270 illustrated in FIG. 6 forms one pixel PX and the liquid crystal molecules positioned in the vertical central region of the pixel PX lie horizontally.

Next, as illustrated in FIGS. 7 and 8, the plate-like electrode 197 is positioned in the first domain D1 of the pixel electrode 191 and the plurality of minute branches 279 are positioned in the first domain D1 of the common electrode 270. The plurality of minute branches 199 are positioned in the second domain D2 of the pixel electrode 191 and the plate-like electrode 277 is positioned in the second domain D2 of the common electrode 270. The plurality of minute branches 199 are positioned in the third domain D3 of the pixel electrode 191 and the plate-like electrode 277 is positioned in the third domain D3 of the common electrode 270. Further, the plate-like electrode 197 is positioned in the fourth domain D4 of the pixel electrode 191 and the plurality of minute branches 279 are positioned in the fourth domain D4 of the common electrode 270.

Although not illustrated, the pixel electrode 191 illustrated in FIG. 7 and the common electrode 270 illustrated in FIG. 8 forms one pixel PX and the liquid crystal molecules positioned in the vertical central region of the pixel PX lie horizontally.

Next, referring first to FIGS. 9 and 10, the plurality of minute branches 199 are positioned in the first domain D1 of the pixel electrode 191 and the plate-like electrode 277 is positioned in the first domain D1 of the common electrode 270. The plate-like electrode 197 is positioned in the second domain D2 of the pixel electrode 191 and the plurality of minute branches 279 are positioned in the second domain D2 of the common electrode 270. The plate-like electrode 197 is positioned in the third domain D3 of the pixel electrode 191 and the plurality of minute branches 279 are positioned in the third domain D3 of the common electrode 270. Further, the plurality of minute branches 199 are positioned in the fourth domain D4 of the pixel electrode 191 and the plate-like electrode 277 is positioned in the fourth domain D4 of the common electrode 270.

Although not illustrated, the pixel electrode 191 illustrated in FIG. 9 and the common electrode 270 illustrated in FIG. 10 forms one pixel PX and the liquid crystal molecules positioned in the vertical central region of the pixel PX lie horizontally.

Hereinafter, a liquid crystal display according to a Comparative Example of the inventive concept will be described with reference to FIGS. 11 to 14.

Figure 11:
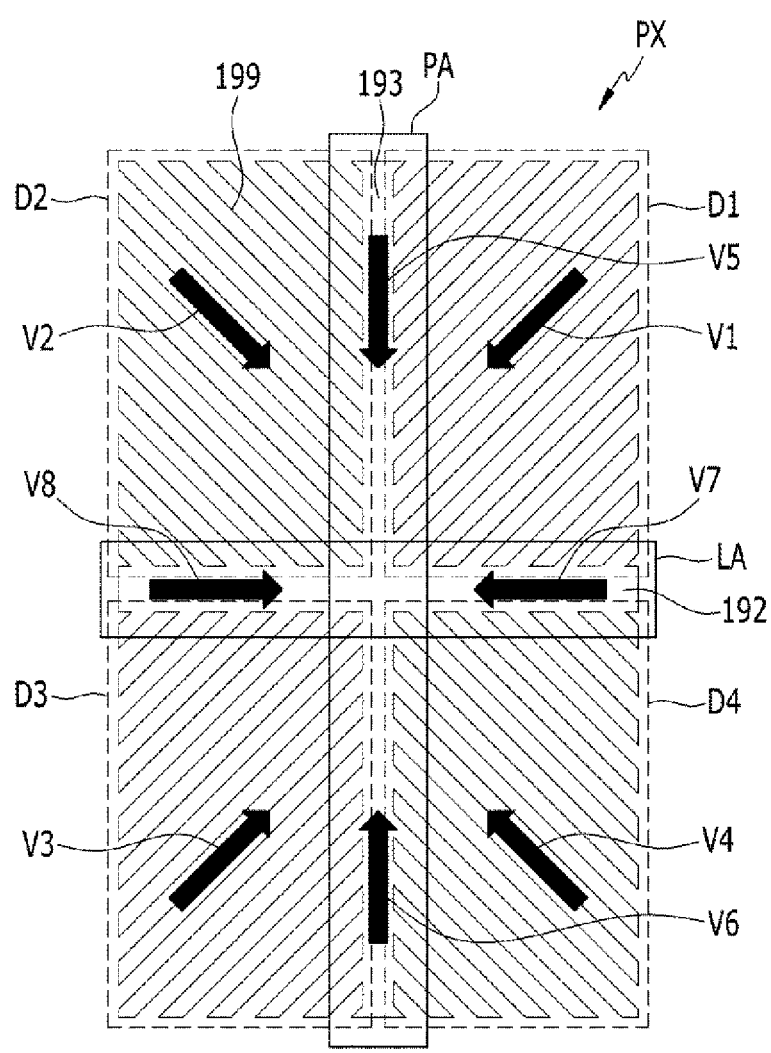
FIG. 11 is a plan view illustrating one pixel including a pixel electrode and a common electrode of a liquid crystal display according to a Comparative Example of the inventive concept.
Figure 12:
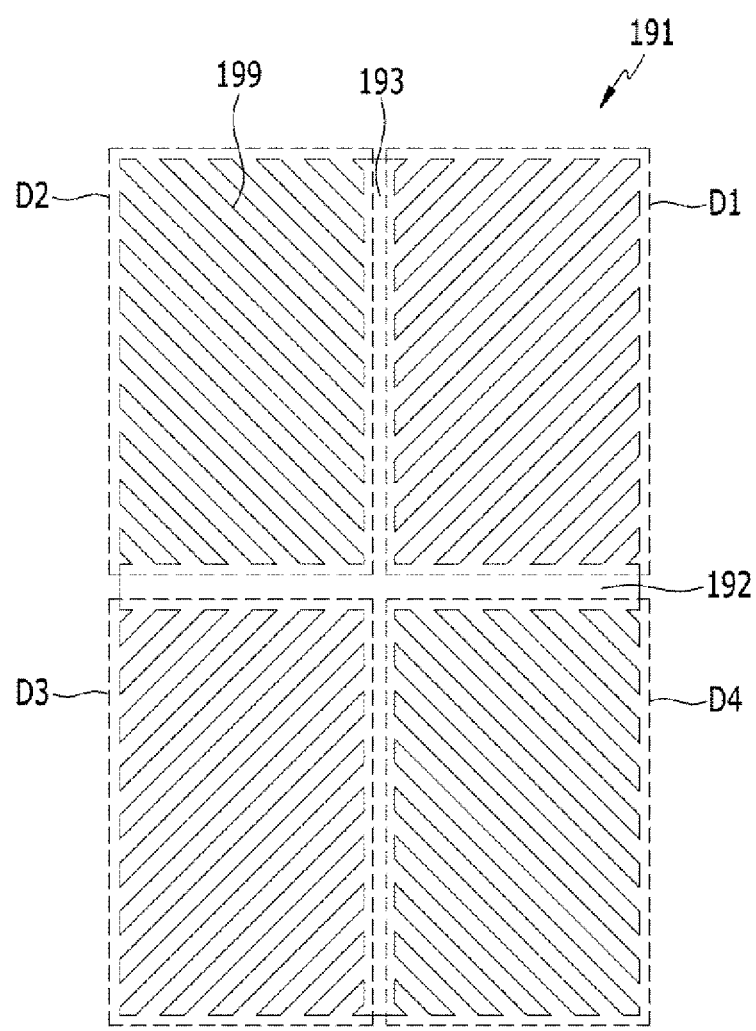
FIG. 12 is a plan view illustrating the pixel electrode of the one pixel illustrated in FIG. 11.
Figure 13:
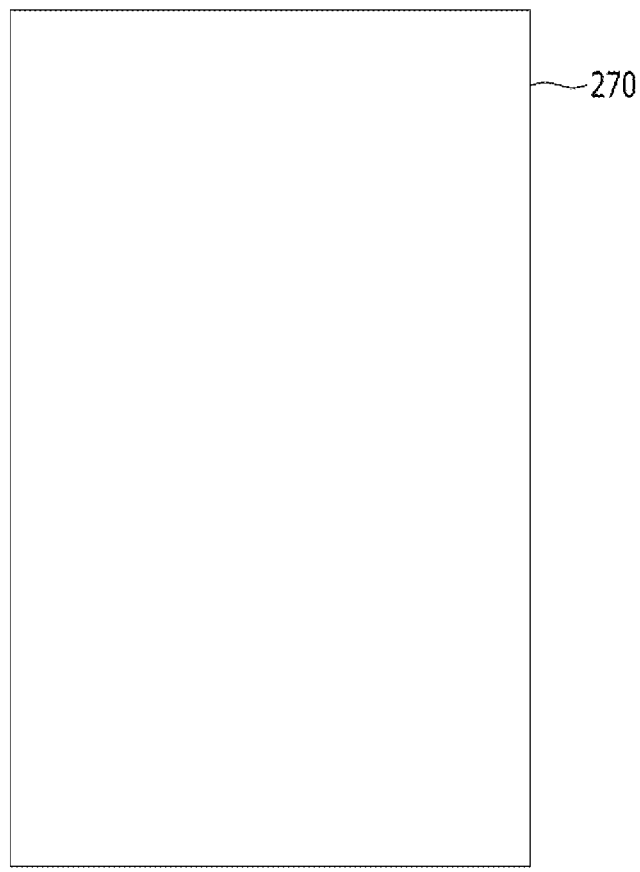
FIG. 13 is a plan view illustrating the common electrode of the one pixel illustrated in FIG. 11.
Figure 14:
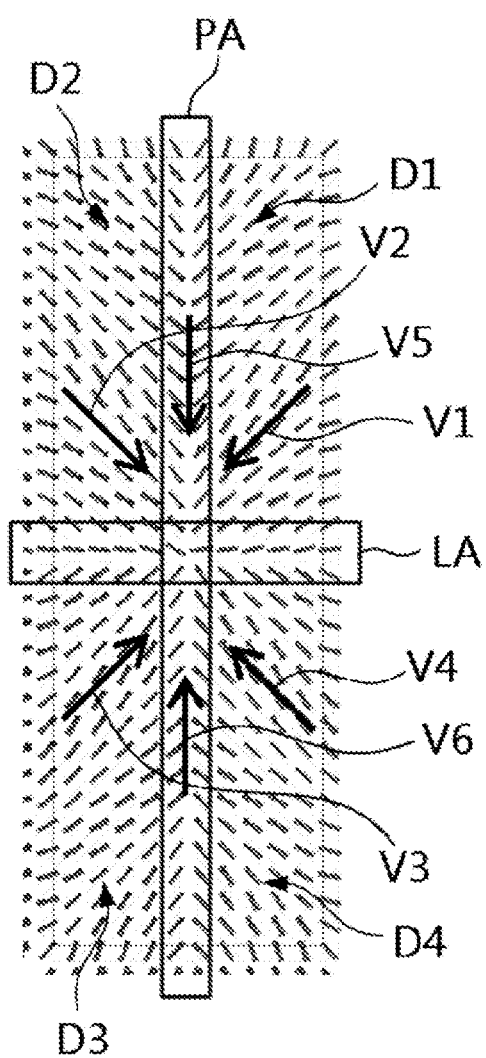
FIG. 14 is a diagram for describing an orientation of liquid crystal molecules for one pixel illustrated in FIG. 11.

FIG. 11 is a plan view illustrating one pixel PX including a pixel electrode 191 and a common electrode 270 of a liquid crystal display according to a Comparative Example of the inventive concept. FIG. 12 is a plan view illustrating the pixel electrode 191 of the one pixel PX illustrated in FIG. 11. FIG. 13 is a plan view illustrating the common electrode 270 of the one pixel PX illustrated in FIG. 11. FIG. 14 is a diagram for describing an orientation of liquid crystal molecules for the one pixel PX illustrated in FIG. 11.

Referring to FIGS. 11 to 13, according to Comparative Example of the inventive concept, the pixel electrode 191 includes four domains D1, D2, D3, and D4 and the common electrode 270 is configured of a single integral panel electrode.

The pixel electrode 191 includes a cruciform stem part which is configured of a horizontal stem part 192 and a vertical stem part 193 orthogonal thereto. The pixel electrode 191 is divided into four domains D1, D2, D3, and D4 by the horizontal stem part 192 and the vertical stem part 193. The horizontal stem part 192 and the vertical stem part 193 form a boundary between the adjacent domains. That is, the vertical central region PAs is positioned between the first domain D1 and the second domain D2 which are adjacent to each other from left to right and between the third domain D3 and the fourth domain D4. The horizontal central regions LAs are positioned between the first domain D1 and the fourth domain D4 which are adjacent to each other from top to bottom and between the second domain D2 and the third domain D3.

The liquid crystal molecules which are positioned in the first domain D1 have a first vector V1 which faces from the outside toward the center at an angle of 45° with respect to the horizontal side and the liquid crystal molecules which are positioned in the second domain D2 have a second vector V2 which faces from the outside toward the center at an angle of −45° with respect to the horizontal side. In this case, the liquid crystal molecules of the vertical central region PA positioned between the first domain D1 and the second domain D2 have a fifth vector V5 which is a sum of the first vector V1 and the second vector V2. That is, the orientation of the liquid crystal molecules which are positioned in the vertical central region PA positioned between the first domain D1 and the second domain D2 faces vertically from top to bottom.

The liquid crystal molecules which are positioned in the third domain D3 have a third vector V3 which faces from the outside toward the center at an angle of 45° with respect to the horizontal side and the liquid crystal molecules which are positioned in the fourth domain D4 have a fourth vector V4 which faces from the outside toward the center at an angle of 135° with respect to the horizontal side. In this case, the liquid crystal molecules which are positioned in the vertical central region PA positioned between the third domain D3 and the fourth domain D4 have a sixth vector V6 which is a sum of the third vector V3 and the fourth vector V4. That is, the orientation of the liquid crystal molecules which are positioned in the vertical central region PA positioned between the third domain D3 and the fourth domain D4 faces vertically from bottom to top.

The liquid crystal molecules which are positioned in the first domain D1 have the first vector V1 which faces from the outside toward the center at an angle of 45° with respect to the horizontal side and the liquid crystal molecules which are positioned in the fourth domain D4 have the fourth vector V4 which faces from the outside toward the center at an angle of 135° with respect to the horizontal side. In this case, the liquid crystal molecules of the horizontal central region LA positioned between the first domain D1 and the fourth domain D4 have a seventh vector V7 which is a sum of the first vector V1 and the fourth vector V4. That is, the orientation of the liquid crystal molecules which are positioned in the horizontal central region LA positioned between the first domain D1 and the fourth domain D4 have a seventh vector V7 faces horizontally from right to left.

The liquid crystal molecules which are positioned in the second domain D2 have the second vector V2 which faces from the outside toward the center at an angle of −45° with respect to a horizontal side and the liquid crystal molecules which are positioned in the third domain D3 have the third vector V3 which faces from the outside toward the center at an angle of 45° with respect to the horizontal side. In this case, the liquid crystal molecules of the horizontal central region LA positioned between the second domain D2 and the third domain D3 have an eighth vector V8 which is a sum of the second vector V2 and the third vector V3. That is, the orientation of the liquid crystal molecules which are positioned in the horizontal central region LA positioned between the second domain D2 and the third domain D3 faces horizontally from left to right.

Referring to FIG. 14, the orientation of the liquid crystal molecules of the one pixel PX of the liquid crystal display according to Comparative Example of the inventive concept may be appreciated.

It may be appreciated that the liquid crystal molecules of the vertical central region PA of the pixel PX face vertically and the liquid crystal molecules of the horizontal central region LA face horizontally.

Figure 15:
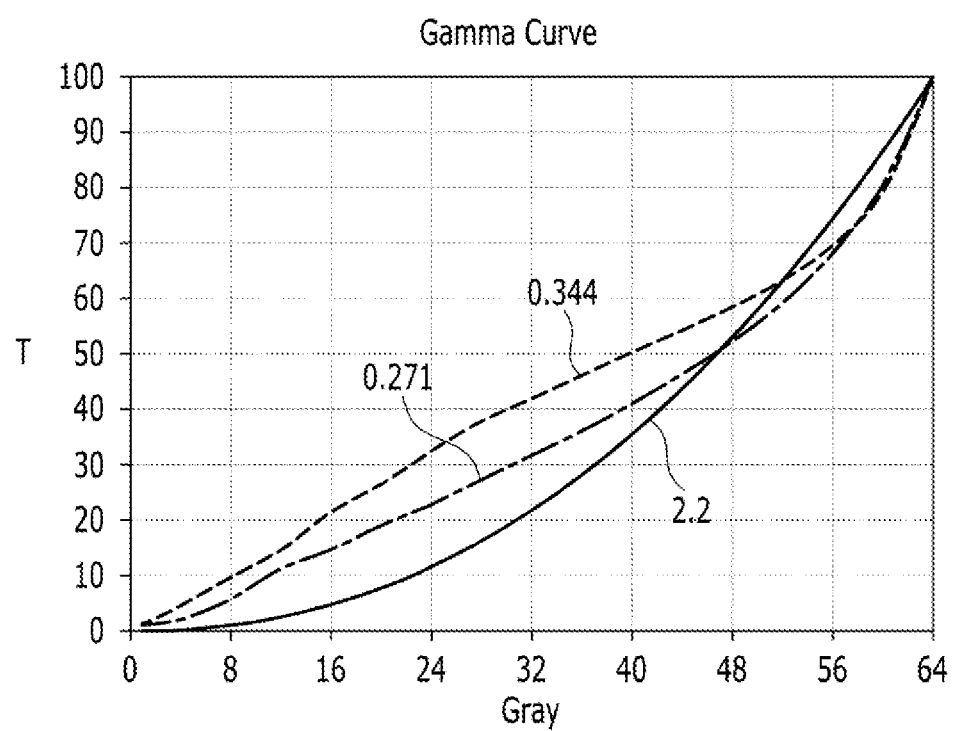
FIG. 15 is a comparison diagram of characteristics of the pixel of the liquid crystal display according to the exemplary embodiment with characteristics of the pixel of the liquid crystal display according to Comparative Example of the inventive concept.

FIG. 15 is a comparison diagram of characteristics of the pixel of the liquid crystal display according to the exemplary embodiment with characteristics of the pixel of the liquid crystal display according to Comparative Example of the inventive concept and illustrates a gamma curve which represents a color sense at a side compared with that at a front.

Referring to FIG. 15, it may be appreciated that when a gamma value of CRT is considered as 2.2, the gamma value of the liquid crystal display according to the exemplary embodiment is 0.271 and the gamma value of the liquid crystal display according to Comparative Example of the inventive concept is 0.344.

That is, the gamma value of the liquid crystal display according to the exemplary embodiment is smaller than that of the liquid crystal display according to Comparative Example of the inventive concept, thereby improving the side visibility.

Hereinafter, referring to FIGS. 16 to 19, the liquid crystal display to which the pixel electrode and the common electrode according to the exemplary embodiment are applied will be described.

First, an arrangement of signal lines and pixels of a liquid crystal display and a driving method thereof according to an exemplary embodiment will be described with reference to FIG. 16.

Figure 16:
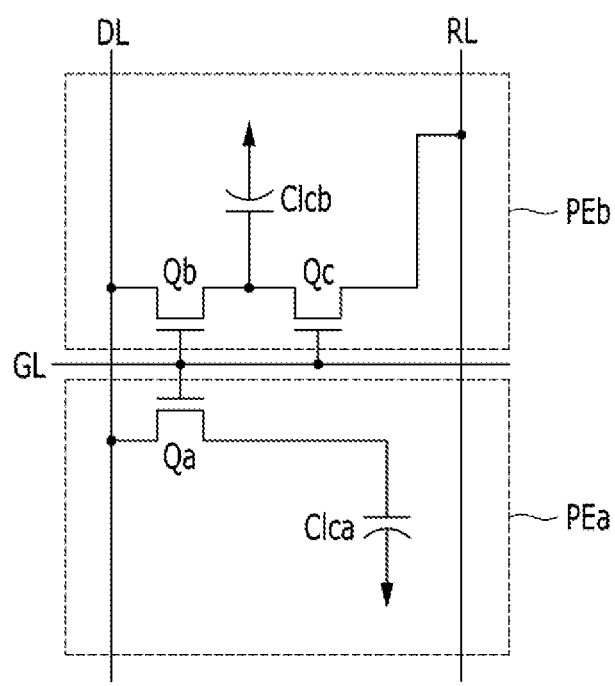
FIG. 16 is an equivalent circuit diagram of one pixel of a liquid crystal display according to the exemplary embodiment.

FIG. 16 is an equivalent circuit diagram of one pixel of a liquid crystal display according to the exemplary embodiment.

Referring to FIG. 16, one pixel PX of the liquid crystal display according to the exemplary embodiment includes a plurality of signal lines which includes a gate line GL transferring a gate signal, a data line DL transferring a data signal, and a voltage dividing reference voltage line RL which transfers voltage dividing reference voltage, first, second, and third switching elements Qa, Qb, and Qc which are connected to the plurality of signal lines, and first and second liquid crystal capacitors Clca and Clcb.

The first and second switching elements Qa and Qb are each connected to the gate line GL and the data line DL and the third switching element Qc is connected to an output terminal of the second switching element Qb and the voltage dividing reference line RL The first and second switching elements Qa and Qb are a three terminal element, such as a thin film transistor, and control terminals thereof are connected to the gate line GL and input terminals thereof are connected to the data line DL. An output terminal of the first switching element Qa is connected to the first liquid crystal capacitor Clca and the output terminal of the second switching element Qb is connected to input terminals of the second liquid crystal capacitor Clcb and the third switching element Qc.

The third switching element Qc is also the three terminal element, such as the thin film transistor, and a control terminal thereof is connected to the gate line GL, an input terminal thereof is connected to the second liquid crystal capacitor Clcb, and an output terminal thereof is connected to the voltage dividing reference voltage line RL.

When a gate on signal is applied to the gate line GL, the first, second, and third switching elements Qa, Qb, and Qc which are connected to the gate line GL are turned on. Therefore, a data voltage applied to the data line DL is applied to a first sub-pixel electrode PEa and a second sub-pixel electrode PEb through the first and second switching elements Qa and Qb which are turned on. In this case, the data voltage which is applied to the first sub-pixel electrode PEa and the second sub-pixel electrode PEb is the same and the first and second liquid crystal capacitors Clca and Clcb are charged with the same value as a difference between a common voltage and the data voltage. At the same time, a voltage charged in the second liquid crystal capacitor Clcb is divided by the third switching element Qc which is turned on. As a result, a voltage value which is charged in the second liquid crystal capacitor Clcb is lowered by a difference between the common voltage and the voltage dividing reference voltage. That is, the voltage which is charged in the first liquid crystal capacitor Clca is higher than the voltage which is charged in the second liquid crystal capacitor Clcb.

As such, the voltage which is charged in the first liquid crystal capacitor Clca and the voltage which is charged in the second liquid crystal capacitor Clcb are different from each other. Since the voltage of the first liquid crystal capacitor Clca and the voltage of the second liquid crystal capacitor Clcb are different from each other, inclined angles of liquid crystal molecules in the first sub-pixel and the second sub-pixel are different from each other, and thus the luminance of the first sub-pixel and the luminance of the second sub-pixel are different from each other. Therefore, when the voltage of the first liquid crystal capacitor Clca and the voltage of the second liquid crystal capacitor Clcb are appropriately controlled, an image viewed from a side may maximally approach an image viewed from a front, thereby improving side visibility.

In order to make the voltage charged in the first liquid crystal capacitor Clca and the voltage charged in the second liquid crystal capacitor Clcb different, the exemplary embodiment illustrated includes the second liquid crystal capacitor Clcb and the third switching element Qc connected to the voltage dividing reference voltage line RL, but in the case of the liquid crystal display according to another exemplary embodiment, the second liquid crystal capacitor Clcb may also be connected to a step-down capacitor. In detail, the liquid crystal display includes the third switching element which includes a first terminal connected to a step-down gate line, a second terminal connected to the second liquid crystal capacitor Clcb, and a third terminal connected to the step-down capacitor to charge a portion of an amount charged in the second liquid crystal capacitor Clcb in the step-down capacitor, thereby making the charging voltage between the first liquid crystal capacitor Clca and the second liquid crystal capacitor Clcb different. Further, in the case of the liquid crystal display according to another exemplary embodiment, the first and second liquid crystal capacitors Clca and Clcb are connected to different data lines to be applied with different data voltages, thereby making the charging voltage between the first and second liquid crystal capacitors Clca and Clcb differently set. In addition, the charging voltage between the first and second liquid crystal capacitors Clca and Clcb may be differently set by other several methods.

Next, a structure of the liquid crystal display according to the exemplary embodiment illustrated in FIG. 16 will be described in detail with reference to FIGS. 17 and 18.

Figure 17:
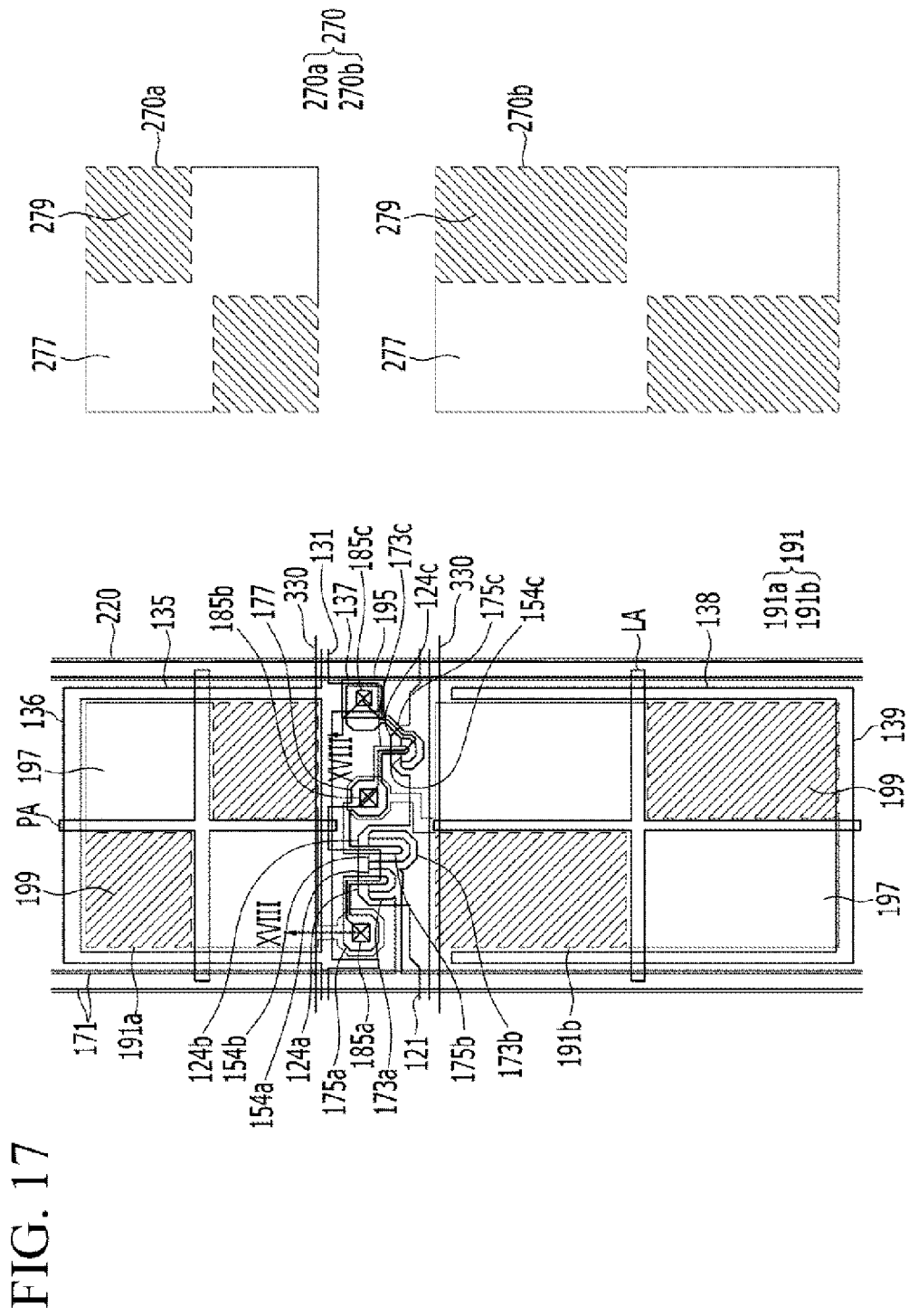
FIG. 17 is a layout view of an example of one pixel of the liquid crystal display according to the exemplary embodiment.

FIG. 17 is a layout view of an example of one pixel of the liquid crystal display according to the exemplary embodiment and is a layout diagram of an example of one pixel to which the pixel electrode illustrated in FIG. 2 and the common electrode illustrated in FIG. 3 are applied. FIG. 18 is a cross-sectional view of the liquid crystal display of FIG. 17 taken along the line XVIII-XVIII.

Figure 18:
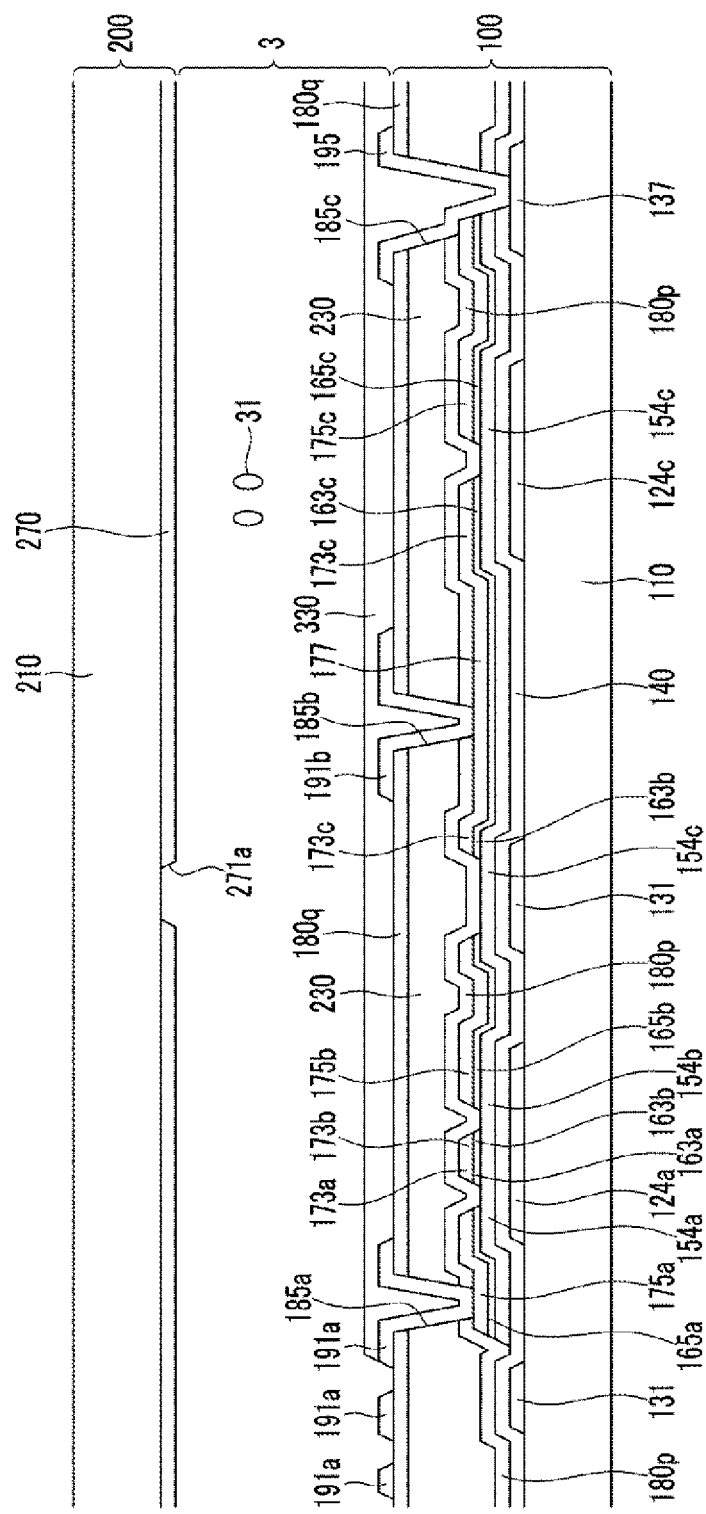
FIG. 18 is a cross-sectional view of the liquid crystal display of FIG. 17 taken along the line XVIII-XVIII.

First, referring to FIGS. 17 and 18, the liquid crystal display according to the exemplary embodiment includes a lower display panel 100 and an upper display panel 200 facing each other, a liquid crystal layer 3 interposed between the two display panels 100 and 200, an pair of polarizers (not illustrated) which is attached outside the display panels 100 and 200.

First, the lower panel 100 will be described.

A gate conductor which includes a gate line 121 and a voltage dividing reference voltage line 131 is formed on an insulating substrate 110 made of transparent glass, plastic, or the like.

The gate line 121 includes a wide end (not illustrated) so as to be connected to a first gate electrode 124a, a second gate electrode 124b, a third gate electrode 124c, and other layers or external driving circuits.

The voltage dividing reference voltage line 131 includes first storage electrodes 135 and 136 and a reference electrode 137. Second storage electrodes 138 and 139 which are not connected to the voltage dividing reference voltage line 131 but overlap a second sub-pixel electrode 191b are disposed.

A gate insulating layer 140 is formed on the gate line 121 and the voltage dividing reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A plurality of data lines 171 including a first source electrode 173a and a second source electrode 173b and a data conductor including a first drain electrode 175a, a second drain electrode 175b, a third source electrode 173c, and a third drain electrode 175c are formed on the ohmic contacts 163a, 165a, 163b, 165b, 163c, and 165c and the gate insulating layer 140.

The data conductor, the semiconductor disposed thereabeneath, and the ohmic contact may be simultaneously formed using a single mask.

The data line 171 includes a wide end (not illustrated) for connection with another layer or an external driving circuit.

The first gate electrode 124a, the first source electrode 173a, and the first drain electrode 175a form a first thin film transistor (TFT) Qa, along with the first semiconductor 154a and a channel of the first thin film transistor Qa is formed on the semiconductor 154a between the first source electrode 173a and the first drain electrode 175a. Similarly, the second gate electrode 124b, the second source electrode 173b, and the second drain electrode 175b form a second thin film transistor Qb, along with the second semiconductor 154b, the channel is formed on the semiconductor 154b between the second source electrode 173b and the second drain electrode 175b. The third gate electrode 124c, the third source electrode 173c, and the third drain electrode 175c forms a third thin film transistor Qc, along with the third semiconductor 154c, and the channel is formed on the semiconductor 154c between the third source electrode 173c and the third drain electrode 175c.

The second drain electrode 175b is connected to the third source electrode 173c and includes a wide expansion 177 which is widely expanded.

A first passivation layer 180p is formed on the data conductors 171, 173c, 175a, 175h, and 175c and the exposed semiconductors 154a, 154b, and 154c. The first passivation layer 18 may include an inorganic insulating layer made of silicon nitride, silicon oxide, or the like. The first passivation layer 180p may prevent a pigment of a color filter 230 from flowing in the exposed semiconductors 154a, 154b, and 154c.

The color filter 230 is formed on the first passivation layer 180p. The color filter 230 extends in a vertical direction along two data lines 171 which are adjacent to each other. A first light blocking member 220 is disposed on the first passivation layer 180p, the edge of the color filter 230, and the data line 171.

The first light blocking member 220 extends along the data line 171 and is disposed between the two adjacent color filters 230. A width of the first light blocking member 220 may be larger than that of the data line 171. As such, the width of the first light blocking member 220 is formed to be larger than that of the data line 171, such that the first light blocking member 220 may prevent the light incident from the outside from reflecting from a surface of the data line 171 which is metal. Therefore, the light reflected from the surface of the data line 171 is prevented from interfering with the light transmitting through the liquid crystal layer 3 to be able to prevent a contrast ratio of the liquid crystal display from deteriorating.

A second passivation layer 180q is formed on the color filter 230 and the first light blocking member 230.

The second passivation layer 180q may include an inorganic insulating layer made of silicon nitride, silicon oxide, or the like. The second passivation layer 180q prevents the color filter 230 from lifting and suppresses the pollution of the liquid crystal layer 3 due to organic materials, such as a solvent inflowing from the color filter 230, thereby preventing defects, such as an afterimage which may occur at the time of driving the screen, from occurring.

A first contact hole 185a and a second contact hole 185b, which extend to and expose the first drain electrode 175a and the second drain electrode 175h, are formed on the first passivation layer 180p and the second passivation layer 180q.

A third contact hole 185c, which extends to and exposes a portion of a reference electrode 137 and a portion of the third drain electrode 175c, is formed on the first passivation layer 180p and the second passivation layer 180q, and the gate insulating layer 140, in which the third contact hole 185c is covered with a connection member 195. The connection member 195 electrically connects between the reference electrode 137 and the third drain electrode 175c which are exposed through the third contact hole 185c.

A plurality of pixel electrodes 191 are formed on the second passivation layer 180q. Each of the pixel electrodes 191 are separated from each other, having the gate line 121 disposed therebetween and includes a first sub-pixel electrode 191a and a second sub-pixel electrode 191b which are adjacent to each other in a column direction based on the gate line 121. The pixel electrode 191 may be made of transparent conductive materials, such as ITO and IZO. The pixel electrode 191 may also be made of transparent conductive materials, such as ITO and IZO or reflective metals, such as aluminum, silver, chromium, or an alloy thereof.

The first sub-pixel electrode 191a and the second sub-pixel electrode 191b each include the pixel electrode 191 illustrated in FIGS. 2, 5, 7, and 9 in various embodiments.

The first sub-pixel electrode 191a and the second sub-pixel electrode 191b are physically and electrically connected to the first drain electrode 175a and the second drain electrode 175b, respectively, through the first and second contact holes 185a and 186b and are applied with a data voltage from the first drain electrode 175a and the second drain electrode 175b. In this case, some of the data voltage applied to the second drain electrode 175b is divided by the third source electrode 173c, such that a magnitude of the voltage applied to the first sub-pixel electrode 191a may be larger than that of the voltage applied to the second sub-pixel electrode 191b.

The first sub-pixel electrode 191a and the second sub-pixel electrode 191b to which the data voltage is applied generate an electric field, along with a common electrode 270 of the upper display panel 200, thereby determining an alignment of liquid crystal molecules of the liquid crystal layer 3 between the two electrodes 191 and 270. The luminance of light passing through the liquid crystal layer 3 along with the orientation of the liquid crystal molecules determined as described above is changed.

A second light blocking member 330 is disposed on the pixel electrode 191. The second light blocking member 330 is formed to cover a region in which the first transistor Qa, the second transistor Qb, the third transistor Qc, and the first to third contact holes 185a, 185b, and 185c are disposed and extends in the same direction as the gate line 121 to overlap a portion of the data line 171. The second light blocking member 330 is disposed to at least partially overlap the two data lines 171 which are disposed at both sides of one pixel region to be able to prevent light from leaking which may occur around the data line 171 and the gate line 121 and prevent light from leaking at a region in which the first transistor Qa, the second transistor Qb, and the third transistor Qc are disposed.

Prior to forming the second light blocking member 330, the first passivation layer 180p, the color filler 230, and the second passivation layer 180q are disposed in the region in which the first transistor Qa, the second transistor Qb, the third transistor Qc, and the first to third contact holes 185a, 185b, and 185c are disposed, thereby easily identifying the positions of the first transistor Qa, the second transistor Qb, the third transistor Qc, and the first to third contact holes 185a, 185b, and 185c.

Hereinafter, the upper panel 200 will be described.

The common electrode 270 is formed on an insulating substrate 210. The common electrode 270 includes a first sub-common electrode 270a and a second sub-common electrode 270b.

The first sub-common electrode 270a and the second sub-common electrode 270b each include the common electrode 270 illustrated in FIGS. 3, 6, 8, and 10 in various embodiments.

The first sub-common electrode 270a is disposed at a position corresponding to the first sub-pixel electrode 191a and the second sub-common electrode 270b is disposed at a position corresponding to the second sub-pixel electrode 191b.

The first sub-pixel electrode 191a, the second sub-pixel electrode 191b, the first sub-common electrode 270a, and the second sub-common electrode 270b includes four domains which are disposed in 2 rows×2 columns.

In this case the plate-like electrode 197 of the pixel electrode 191 and the plurality of minute branches 279 of the common electrode 270 are positioned in the corresponding domains, the plurality of minute branches 199 of the pixel electrode 191 and the plate-like electrode 277 of the common electrode 270 may be positioned in the corresponding domains.

An upper alignment layer (not illustrated) is formed on the common electrode 270. The upper alignment layer may be a vertical alignment layer and may be an alignment layer which is photo-aligned by a photopolymerization material.

The polarizer (not illustrated) is disposed on the outer surfaces of the two display panels 100 and 200 and the transmission axes of the two polarizers are orthogonal to each other, in which one of the transmission axes is preferably parallel with the gate line 121. However, the polarizer may also be disposed only on the outer surface of any one of the two display panels 100 and 200.

The liquid crystal layer 3 has a negative dielectric anisotropy and the liquid crystal molecules of the liquid crystal layer 3 are aligned so that the major axes thereof are vertical to the surfaces of the two display panels 100 and 200 in the state in which no electric field is present. Therefore, incident light does not pass through the crossed polarizers but is blocked, in the state in which no electric field is present.

As described above, the first sub-pixel electrode 191a and the second sub-pixel electrode 191b to which the data voltage is applied generate an electric field, along with the first sub-common electrode 270a and the second sub-common electrode 270b of the upper display panel 200. Accordingly, the liquid crystal molecules of the liquid crystal layer 3 aligned to be vertical to the surfaces of the two electrodes 191 and 270 in the state in which no electric field is present lie down toward a horizontal direction with the surfaces of the two electrodes 191, 270 and the luminance of light transmitting through the liquid crystal layer 3 depending on the laid degree of the liquid crystal molecules may be changed.

Next, a method of initially aligning liquid crystal molecule 31 of the liquid crystal layer 3 so as to have a pretilt will be described with reference to FIG. 19.

Figure 19:
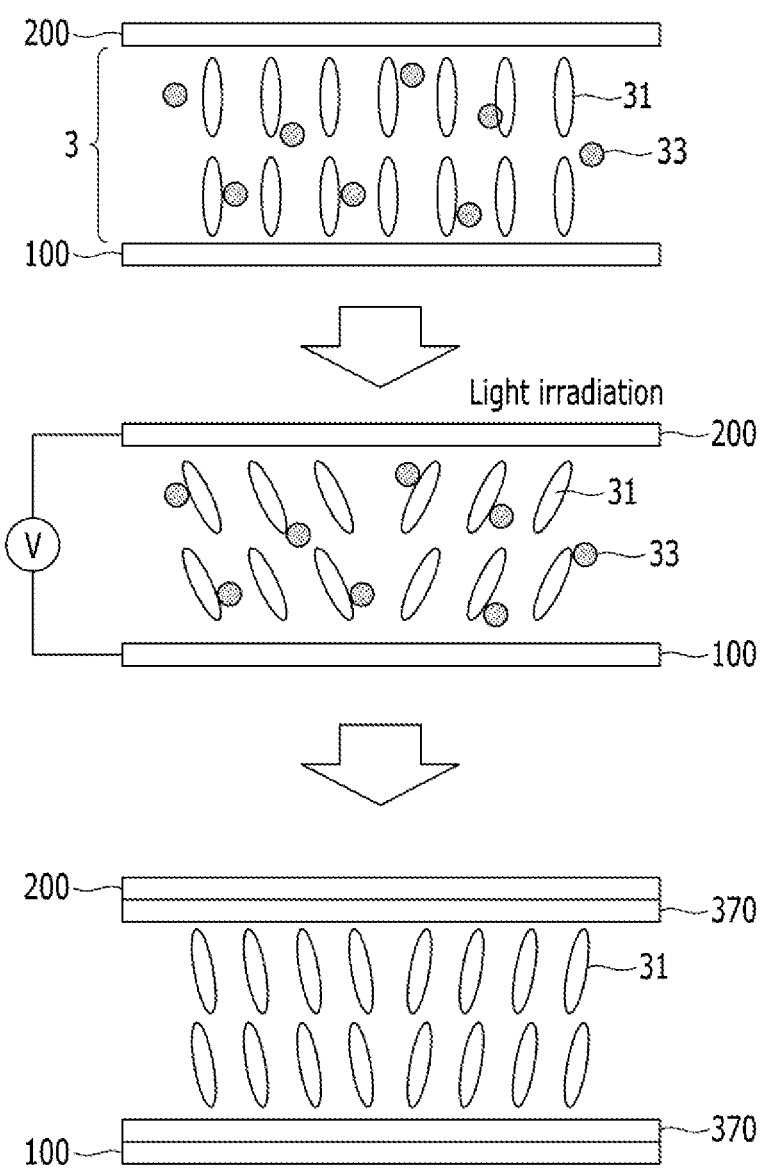
FIG. 19 is a diagram illustrating a process of allowing liquid crystal molecules to have a pretilt using a prepolymer which is polymerized by light such as ultraviolet rays.

FIG. 19 is a diagram illustrating a process of allowing liquid crystal molecules 31 to have a pretilt using a prepolymer which is polymerized by light such as ultraviolet rays.

First, a prepolymer 33, such as a monomer which is cured by polymerization due to light, such as ultraviolet rays, is injected between the two display panels 100 and 200, along with the liquid crystal material. The prepolymer 33 may be reactive mesogen which performs the polymerization reaction by light, such as ultraviolet rays.

Next, the electric field is generated in the liquid crystal layer 3 between the two display panels 100 and 200 by applying the data voltage to the first sub-pixel electrode 191a and the second sub-pixel electrode 191b and applying the common voltage to the first sub-common electrode 270a and the second sub-common electrode 270b of the upper display panel 200.

Next, liquid crystal molecules 31 of the liquid crystal layer 3 are inclined in a direction parallel with the length directions of the minute branches 199, 279 through the two steps as described above in response to the electric field and the direction in which the liquid crystal molecules 31 are inclined in one pixel is a total of four directions.

When the electric field is generated in the liquid crystal layer 3 and then the light, such as ultraviolet rays, is irradiated thereto, the prepolymer 33 is subjected to the polymerization reaction to form a polymer 370 as illustrated in FIG. 19. The polymer 370 is formed by contacting the display panels 100 and 200. The alignment direction of the liquid crystal molecules 31 is defined by the polymer 370 to have the pretilt in the direction as described above. Therefore, the liquid crystal molecules 31 are aligned to have the pre tilt in four different directions even in the state in which a voltage is not applied to the field generating electrodes 191 and 270.

Hereinafter, referring to FIGS. 20 and 21, the liquid crystal display to which the pixel electrode and the common electrode according to the exemplary embodiment are applied will be described.

Figure 20:
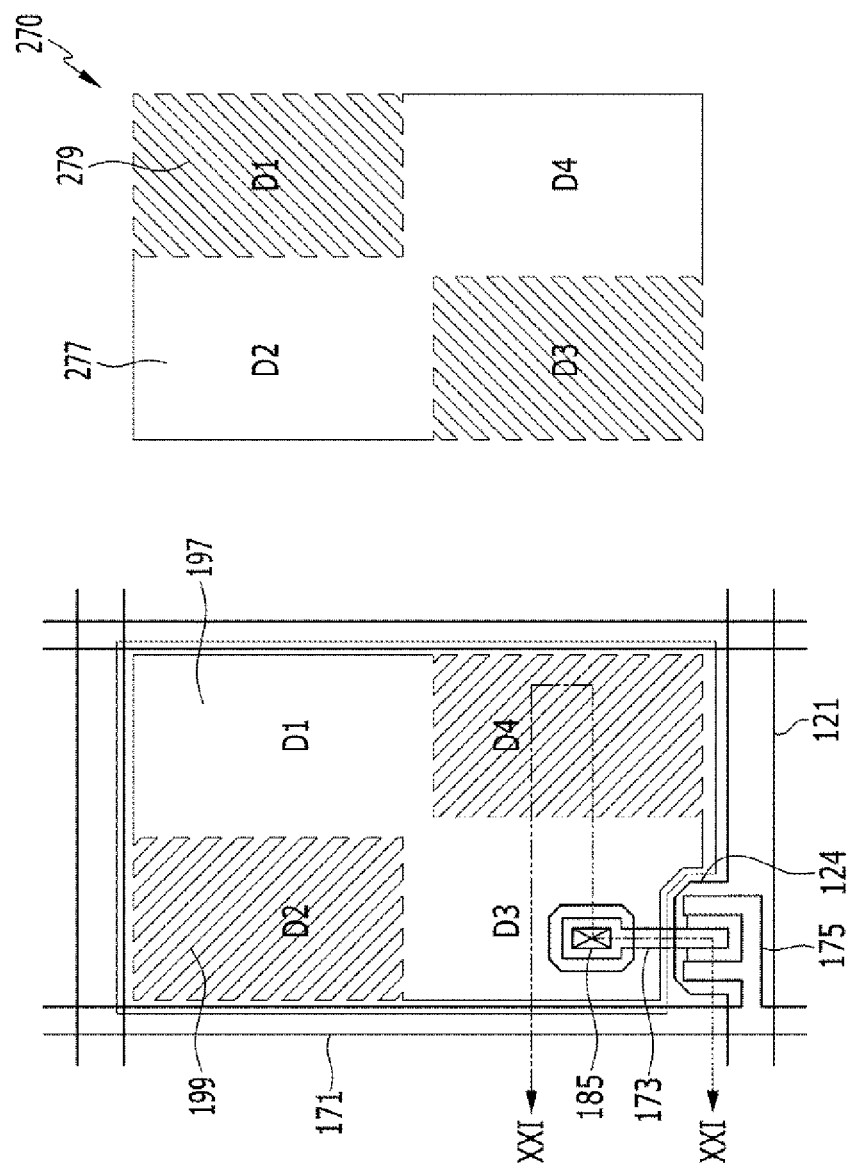
FIG. 20 is a layout view of an example of one pixel of the liquid crystal display according to the exemplary embodiment.

FIG. 20 is a layout view of an example of one pixel of the liquid crystal display according to the exemplary embodiment and is a layout diagram of another example of one pixel to which the pixel electrode illustrated in FIG. 2 and the common electrode illustrated in FIG. 3 are applied. FIG. 21 is a cross-sectional view of the liquid crystal display of FIG. 20 taken along the line XXI-XXI. One pixel of the liquid crystal display according to the exemplary embodiment illustrated in FIGS. 17 and 18 includes the pixel electrode and the common electrode and the pixel electrode and the common electrode each include the first sub-pixel electrode, the second sub-pixel electrode, the first sub-common electrode, and the second sub-common electrode. Further, one pixel of the liquid crystal display according to the exemplary embodiment illustrated in FIGS. 20 and 21 includes one pixel electrode and one common electrode. Therefore, the same components are denoted by the same reference numerals and the repeated description thereof will be omitted.

Figure 21:
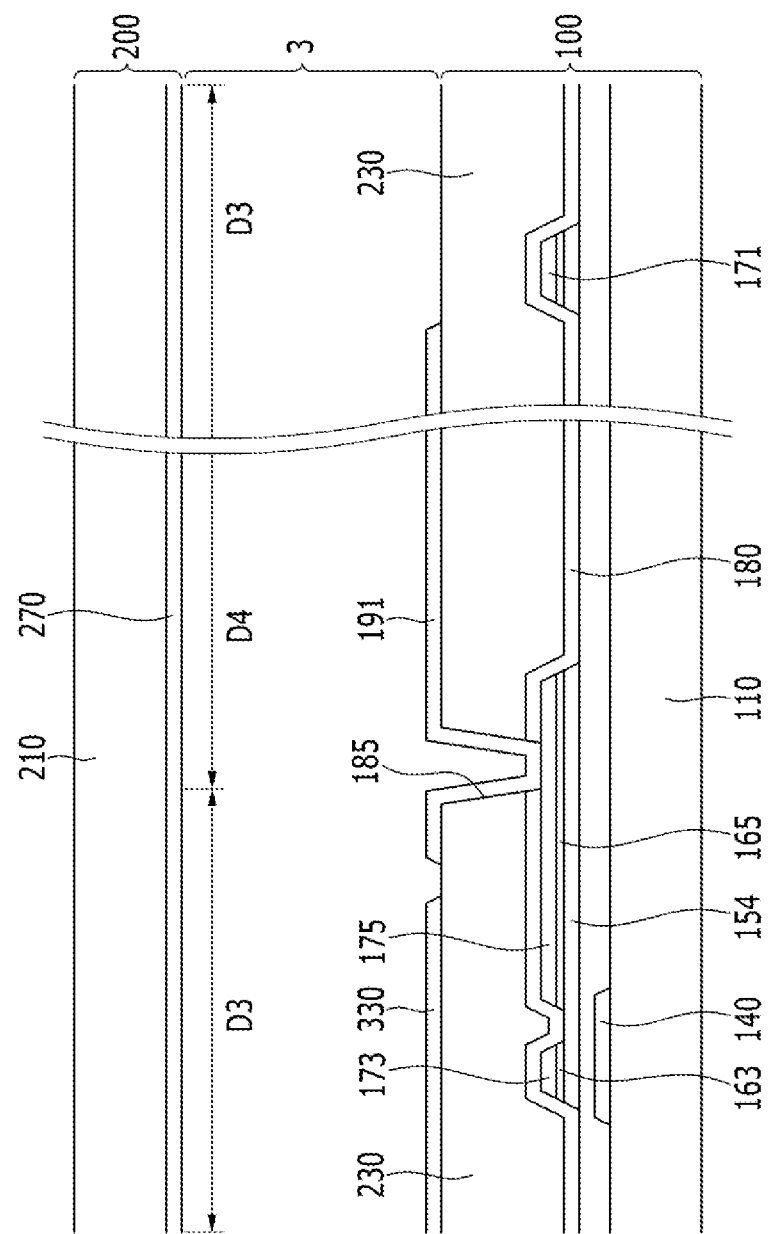
FIG. 21 is a cross-sectional view of the liquid crystal display of FIG. 20 taken along the line XXI-XXI.

Referring to FIGS. 20 and 21, the liquid crystal display according to the exemplary embodiment includes a lower display panel 100 and an upper display panel 200 facing each other, a liquid crystal layer 3 interposed between the two display panels 100 and 200, an a pair of polarizers (not illustrated) which is attached outside the display panels 100 and 200.

First, the lower panel 100 will be described.

The gate lines 121 in a horizontal direction and the data lines 171 in the vertical direction are disposed on the insulating substrate 110 and a thin film transistor including the gate electrode 124, the semiconductor layer 154, the ohmic contact 165, and the source/drain electrodes 173 and 175 is disposed in a region in which the gate line 121 meets the data line 171.

A light blocking member 330 which blocks light is disposed on the gate line 121, the data line 171, and the thin film transistor (TFT).

The plurality of pixel electrodes 191 are connected to the drain electrode 175 through a contact hole 185.

The pixel electrode 191 may each be configured of a pixel electrode 191 illustrated in FIGS. 2, 5, 7, and 9 in various embodiments.

Hereinafter, the upper panel 200 will be described.

The common electrode 270 is formed on the insulating substrate 210. The common electrode 270 may be configured of the common electrode 270 illustrated in FIGS. 3, 6, 8, and 10 in various embodiments.

The pixel electrode 191 and the common electrode 270 each include four domains which are disposed in 2 rows×2 columns.

In this case the plate-like electrode 197 of the pixel electrode 191 and the plurality of minute branches 279 of the common electrode 270 are positioned in the corresponding domains, the plurality of minute branches 199 of the pixel electrode 191 and the plate-like electrode 277 of the common electrode 270 may be positioned in the corresponding domains.

As such, the plurality of pixels of the liquid crystal display according to the exemplary embodiment is configured of one pixel electrode 191 and one common electrode 270 without forming the first and second sub-pixel electrodes and the first and second sub-common electrodes to improve the side visibility and reduces the width of the light blocking member 330 to improve the aperture ratio.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| GL, 121: Gate line | RL, 131: Voltage dividing reference voltage line |
| DL, 171: Data line | Clca, Clab: Liquid crystal capacitor |
| Qa, Qb, Qc: Switching element(thin film transistor) | |
| 110, 210: Substrate | 124a, 124b, 124c: Gate electrode |
| 140: Gate insulating layer | 154a, 154b, 154c: Semiconductor |
| 163a, 165a, 163b, 165b, 163c, 165c: Ohmic contact | |
| 173a, 173b, 173c: Source electrode | 175a, 175b, 175c: Drain electrode |
| 180p, 180q: Passivation layer | 191: Pixel electrode |
| 191a, 191b: Sub-pixel electrode | 197, 277: Plate-like electrode |
| 199, 279: A plurality of minute branches | 220: first light blocking member |
| 230: Color filter | 270: Common electrode |
| 330: Second light blocking member | |
| D1: First domain | D2: Second domain |
| D3: Third domain | D4: Fourth domain |

What is claimed is:

1. A liquid crystal display, comprising:
a first substrate;
a plurality of pixel electrodes comprising a pixel electrode disposed on the first substrate and including a plate-like electrode having a plate shape and a plurality of minute branches extending from a side of the plate-like electrode to the outside;
a second substrate facing the first substrate;
a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and
a liquid crystal layer disposed between the first substrate and the second substrate, wherein:
the pixel electrode and the common electrode each include four domains,
the domains are arranged in 2 rows×2 columns,
a first domain is disposed in a second column of a first row, a second domain is disposed in a first column of the first row, a third domain is disposed in a first column of a second row, and a fourth domain is disposed in a second column of the second row, and
a plurality of pixels including the pixel electrodes and the common electrodes include vertical central regions disposed between the first and fourth domains and the second and third domains and horizontal central regions disposed between the first and second domains and the third and fourth domains.

2. The liquid crystal display of claim 1, wherein:
the first domain and the third domain of the pixel electrode are disposed with the plate-like electrode and the second domain and the fourth domain of the pixel electrode are disposed with the plurality of minute branches, and
the first domain and the third domain of the common electrode are disposed with the plurality of minute branches and the second domain and the fourth domain of the common electrode are disposed with the plate-like electrode.

3. The liquid crystal display of claim 1, wherein:
the second domain and the fourth domain of the pixel electrode are disposed with the plate-like electrode and the first domain and the third domain of the pixel electrode are disposed with the plurality of minute branches, and the second domain and the fourth domain of the common electrode are disposed with the plurality of minute branches and the first domain and the third domain of the common electrode are disposed with the plate-like electrode.

4. The liquid crystal display of claim 1, wherein:
the first domain and the fourth domain of the pixel electrode are disposed with the plate-like electrode and the second domain and the third domain of the pixel electrode are disposed with the plurality of minute branches, and
the first domain and the fourth domain of the common electrode are disposed with the plurality of minute branches and the second domain and the third domain of the common electrode are disposed with the plate-like electrode.

5. The liquid crystal display of claim 1, wherein:
the second domain and the third domain of the pixel electrode are disposed with the plate-like electrode and the first domain and the fourth domain of the pixel electrode are disposed with the plurality of minute branches, and
the second domain and the third domain of the common electrode are disposed with the plurality of minute branches and the first domain and the fourth domain of the common electrode are disposed with the plate-like electrode.

6. The liquid crystal display of claim 1, wherein:
liquid crystal molecules disposed in the vertical central regions head for a horizontal direction at the time of applying a voltage and liquid crystal molecules disposed at the horizontal central regions head for a vertical direction at the time of applying a voltage.

7. The liquid crystal display of claim 6, wherein:
the liquid crystal molecules disposed in the vertical central regions lies at 45° or less based on a horizontal side.

8. The liquid crystal display of claim 1, wherein:
the plurality of minute branches are formed at an angle from 40° to 50° with respect to a horizontal direction or a vertical direction.

9. The liquid crystal display of claim 1, wherein:
the pixel electrode and the common electrode have a rectangular shape of which the vertical length is longer than a horizontal length.

10. A liquid crystal display, comprising:
a first substrate;
a plurality of pixel electrodes comprising a pixel electrode disposed on the first substrate and including a plate-like electrode having a plate shape and a plurality of minute branches extending from a side of the plate-like electrode to the outside;
a second substrate facing the first substrate;
a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and
a liquid crystal layer disposed between the first substrate and the second substrate,
wherein:
the pixel electrode includes a first sub-pixel electrode and a second sub-pixel electrode,
the common electrode includes a first sub-common electrode and a second sub-common electrode,
the first sub-pixel electrode, the second sub-pixel electrode, the first sub-common electrode, and the second sub-common electrode each include four domains,
the domains are arranged in 2 rows×2 columns,
a first domain is disposed in a second column of a first row, a second domain is disposed in a first column of the first row, a third domain is disposed in a first column of a second row, and a fourth domain is disposed in a second column of the second row,
the first domain and the third domain of the sub-pixel electrodes are disposed with the plate-like electrode and the second domain and the fourth domain of the sub-pixel electrodes are disposed with the plurality of minute branches, and
the first domain and the third domain of the sub-common electrodes are disposed with the plurality of minute branches and the second domain and the fourth domain of the sub-common electrodes are disposed with the plate-like electrode.

11. A liquid crystal display, comprising:
a first substrate;
a plurality of pixel electrodes comprising a pixel electrode disposed on the first substrate and including a plate-like electrode having a plate shape and a plurality of minute branches extending from a side of the plate-like electrode to the outside;
a second substrate facing the first substrate;
a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and
a liquid crystal layer disposed between the first substrate and the second substrate,
wherein:
the pixel electrode includes a first sub-pixel electrode and a second sub-pixel electrode,
the common electrode includes a first sub-common electrode and a second sub-common electrode,
the first sub-pixel electrode, the second sub-pixel electrode, the first sub-common electrode, and the second sub-common electrode each include four domains,
the domains are arranged in 2 rows×2 columns,
a first domain is disposed in a second column of a first row, a second domain is disposed in a first column of the first row, a third domain is disposed in a first column of a second row, and a fourth domain is disposed in a second column of the second row,
the second domain and the fourth domain of the sub-pixel electrodes are disposed with the plate-like electrode and the first domain and the third domain of the sub-pixel electrodes are disposed with the plurality of minute branches, and
the second domain and the fourth domain of the sub-common electrodes are disposed with the plurality of minute branches and the first domain and the third domain of the sub-common electrodes are disposed with the plate-like electrode.

12. A liquid crystal display, comprising:
a first substrate;
a plurality of pixel electrodes comprising a pixel electrode disposed on the first substrate and including a plate-like electrode having a plate shape and a plurality of minute branches extending from a side of the plate-like electrode to the outside;

a second substrate facing the first substrate;
a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and
a liquid crystal layer disposed between the first substrate and the second substrate,
wherein:
the pixel electrode includes a first sub-pixel electrode and a second sub-pixel electrode,
the common electrode includes a first sub-common electrode and a second sub-common electrode,
the first sub-pixel electrode, the second sub-pixel electrode, the first sub-common electrode, and the second sub-common electrode each include four domains,
the domains are arranged in 2 rows×2 columns,
a first domain is disposed in a second column of a first row, a second domain is disposed in a first column of the first row, a third domain is disposed in a first column of a second row, and a fourth domain is disposed in a second column of the second row,
the first domain and the fourth domain of the sub-pixel electrodes are disposed with the plate-like electrode and the second domain and the third domain of the sub-pixel electrodes are disposed with the plurality of minute branches, and
the first domain and the fourth domain of the sub-common electrodes are disposed with the plurality of minute branches and the second domain and the third domain of the sub-common electrodes are disposed with the plate-like electrode.

13. A liquid crystal display, comprising:
a first substrate;
a plurality of pixel electrodes comprising a pixel electrode disposed on the first substrate and including a plate-like electrode having a plate shape and a plurality of minute branches extending from a side of the plate-like electrode to the outside;
a second substrate facing the first substrate;
a plurality of common electrodes comprising a common electrode disposed below the second substrate and including a plurality of minute branches positioned to correspond to the plate-like electrode of the pixel electrode and a plate-like electrode positioned to corresponding to the plurality of minute branches of the pixel electrode; and
a liquid crystal layer disposed between the first substrate and the second substrate,
wherein:
the pixel electrode includes a first sub-pixel electrode and a second sub-pixel electrode,
the common electrode includes a first sub-common electrode and a second sub-common electrode,
the first sub-pixel electrode, the second sub-pixel electrode, the first sub-common electrode, and the second sub-common electrode each include four domains,
the domains are arranged in 2 rows×2 columns,
a first domain is disposed in a second column of a first row, a second domain is disposed in a first column of the first row, a third domain is disposed in a first column of a second row, and a fourth domain is disposed in a second column of the second row,
the second domain and the third domain of the sub-pixel electrodes are disposed with the plate-like electrode and the first domain and the fourth domain of the sub-pixel electrodes are disposed with the plurality of minute branches, and
the second domain and the third domain of the sub-common electrodes are disposed with the plurality of minute branches and the first domain and the fourth domain of the sub-common electrodes are disposed with the plate-like electrode.

\* \* \* \* \*